(12) United States Patent
Chen et al.

(10) Patent No.: US 11,601,046 B2
(45) Date of Patent: Mar. 7, 2023

(54) THREE-PHASE DOUBLE T-TYPE FOUR-LEVEL RECTIFIER

(71) Applicant: Wayne State University, Detroit, MI (US)

(72) Inventors: Jianfei Chen, Lanham, MD (US); Caisheng Wang, Troy, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 0 days.

(21) Appl. No.: 17/280,630

(22) PCT Filed: Sep. 26, 2019

(86) PCT No.: PCT/US2019/053082
§ 371 (c)(1),
(2) Date: Mar. 26, 2021

(87) PCT Pub. No.: WO2020/069071
PCT Pub. Date: Apr. 2, 2020

(65) Prior Publication Data
US 2022/0029529 A1 Jan. 27, 2022

Related U.S. Application Data

(60) Provisional application No. 62/738,009, filed on Sep. 28, 2018, provisional application No. 62/738,013, filed on Sep. 28, 2018.

(51) Int. Cl.
*H02M 1/44* (2007.01)
*H02M 7/487* (2007.01)
(Continued)

(52) U.S. Cl.
CPC .............. *H02M 1/44* (2013.01); *H02M 7/487* (2013.01); *H02M 7/797* (2013.01); *H02M 7/219* (2013.01); *H02M 7/483* (2013.01); *H02M 7/4833* (2021.05)

(58) Field of Classification Search
CPC .... H02M 7/219; H02M 7/483; H02M 7/4837; H02M 7/797; H02M 1/44; H02M 7/487
See application file for complete search history.

(56) References Cited

U.S. PATENT DOCUMENTS 6,031,738 A * 2/2000 Lipo ...................... H02M 7/487
363/43
6,459,596 B1 * 10/2002 Corzine .............. H02M 5/4585
363/127
(Continued)

FOREIGN PATENT DOCUMENTS

CN 108667321 A * 10/2018 .............. H02M 1/12
CN 108667321 A 10/2018

OTHER PUBLICATIONS

International Search Report dated Jan. 2, 2020 for copending International Patent App. No. PCT/US19/53082.
(Continued)

*Primary Examiner* — Jue Zhang
(74) *Attorney, Agent, or Firm* — Fishman Stewart PLLC

(57) ABSTRACT

A four-level rectifier may include an output, a first capacitor, a second capacitor, a third capacitor, and three phases. The first, second, and third capacitors may be connected in series. The output may be connected between the first capacitor and the third capacitor. Each of the three phases may include an input, a first diode, a second diode, a first switch, a second switch, and a third switch. The first diode may be connected between the input and the first capacitor. The second diode may be connected between the input and the third capacitor. The first switch may be connected between the input and the second switch and the third switch. The second switch may be connected to the first capacitor and to the second capacitor. The third switch may be connected to the second capacitor and to the third capacitor.

20 Claims, 20 Drawing Sheets

(51) Int. Cl.
*H02M 7/797* (2006.01)
*H02M 7/483* (2007.01)
*H02M 7/219* (2006.01)

(56) References Cited

U.S. PATENT DOCUMENTS

| | | | |
|---|---|---|---|
| 6,757,185 B2 | 6/2004 | Rojas Romero | |
| 8,547,717 B2* | 10/2013 | Kshirsagar | H02M 7/217 |
| | | | 363/127 |
| 2003/0128563 A1* | 7/2003 | Rojas Romero | H02M 1/4216 |
| | | | 363/89 |
| 2016/0204713 A1* | 7/2016 | Dwari | H02M 7/217 |
| | | | 363/89 |

OTHER PUBLICATIONS

B. Jin and X. Yuan, "Power loss and efficiency analysis of a four-level p-type converter," 2015 17th European Conference on Power Electronics and Applications (EPE'15 ECCE-Europe), 2015, pp. 1-10, doi: 10.1109/EPE.2015.7309379.
G. Sinha and T. A. Lipo, "A four level rectifier-inverter system for drive applications," IAS '96. Conference Record of the 1996 IEEE Industry Applications Conference Thirty-First IAS Annual Meeting, 1996, vol. 2, pp. 980-987.

\* cited by examiner (a) Common Drain (b) Common Source (c) Series diode (d) Reverse-blocking IGBT (e) Single MOSFET (f) Single IGBT

THREE-PHASE DOUBLE T-TYPE FOUR-LEVEL RECTIFIER

CROSS-REFERENCE TO RELATED APPLICATIONS

This application is a national phase of and claims priority to International Patent Application No. PCT/US2019/053082, filed on Sep. 26, 2019, which claims the benefit of U.S. Provisional Patent Application No. 62/738,009, entitled "A Three-Phase Double T-Type Four-Level Rectifier," filed Sep. 28, 2018 and U.S. Provisional Patent Application No. 62/738,013, entitled "A Three-Phase Hybrid Four-Level Rectifier," filed Sep. 28, 2018, the contents of each of which is hereby incorporated by reference in their entirety.

TECHNICAL FIELD

The present application is related to a four-level rectifier.

BACKGROUND

Multi-level converters have become increasingly popular for many applications. These converters may be used to change alternating current (AC) voltage sources (e.g. 3-phase AC source) to a direct current (DC) voltage sources. These converters may be used for applications like electrical vehicle chargers and telecom power supplies.

SUMMARY

A three phase, four-level rectifier is disclosed. For each phase, the rectifier may include an input, and three capacitors arranged at the output. The rectifier may include a first switch being connected between the input and a first side of a second switch and a first side of a third switch, a second side of the second switch being connected to a second side of the first capacitor and a first side of the second capacitor, a second side of the third switch being connected to a second side of the second capacitor and a first side of the third capacitor.

DETAILED DESCRIPTION

Figure 1:
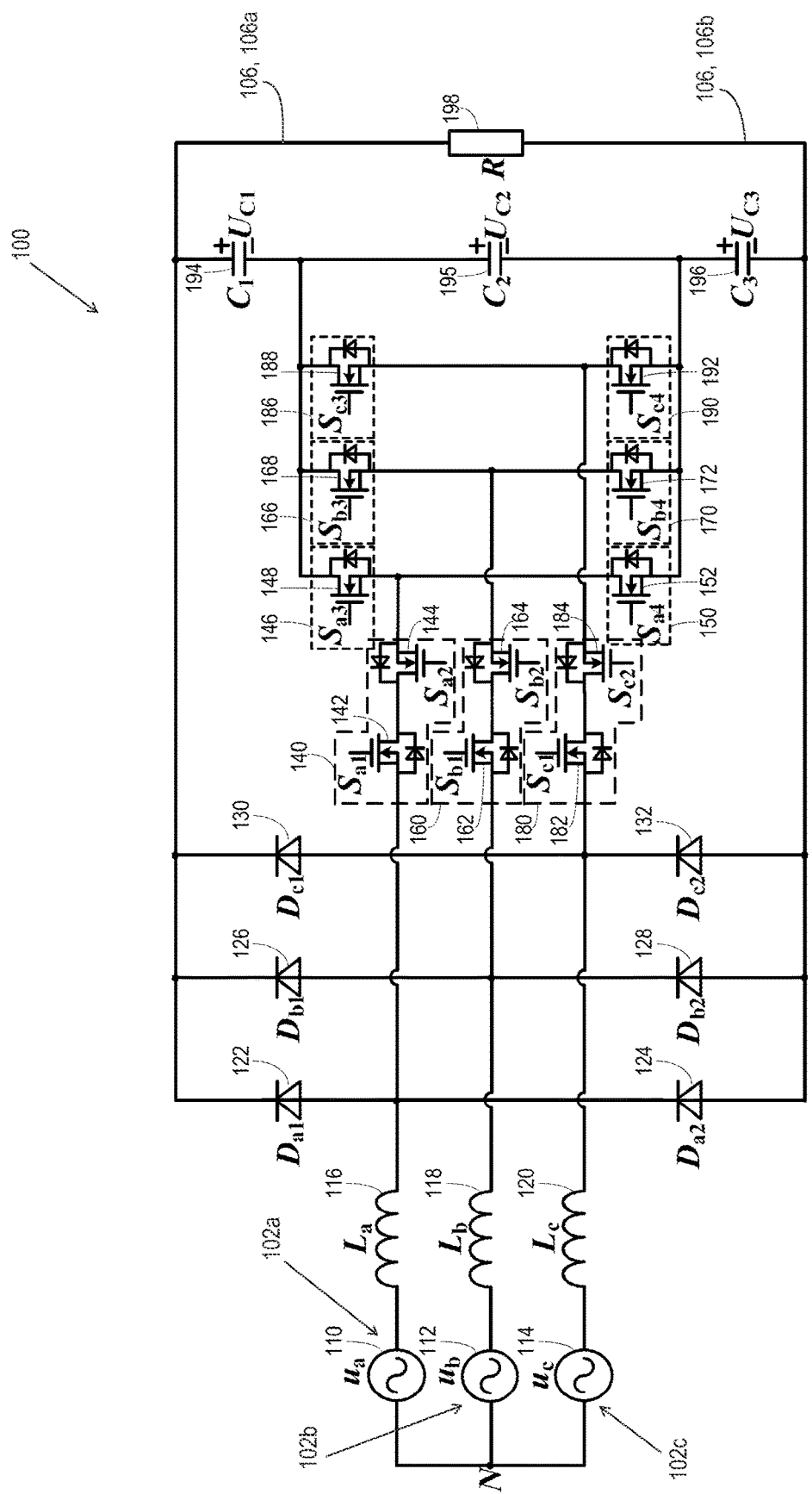
FIG. 1 is a schematic view of a three phase four-level rectifier.

Multilevel converters have caught increasing attention as these converters provide multiple output voltage levels. As the output voltage levels increase, a high quality output voltage can be achieved, including a good total harmonic distortion (THD) with low dv/dt, higher voltage handling capability, mitigated electromagnetic interference (EMI) and a small size of output filter, etc. All of these merits make multilevel converters widely used in medium voltage (1 kV-33 kV) and high power applications. Besides, owing to the continuously growing industrial demand, multilevel converters are also currently considered for low voltage applications (<1 kV) as an alternative to the conventional two-level converter. Compared with a two-level converter, to achieve equivalent output harmonics, the switching frequency of multilevel converters can be kept low, thus reducing the switching losses and shrinking the heatsink size. On the other hand, if operated at the same switching frequency, the filter size of multilevel converters can be smaller. This means multilevel converters provide lower switching loss and a smaller filter requirement due to the use of lower voltage-rating devices and a lower switching voltage, which helps lead to a higher power density. In addition, it also provides a possibility to further increase the switching frequency and achieve a higher power density system. Power density is an important factor in electric aircrafts, electric/hybrid vehicles, electric drive ships, and even solar or wind power generation systems.

In the aircraft generation systems, the variable speed wind power generation systems, and the back-to-back electric drive systems, there is no regenerative power requirement. A three-phase four-level rectifier topology with reduced power switches and diodes may be desired to achieve high power density, low switching loss, and small filters. Among the existing multilevel converters for direct AC/DC conversion, the diode neutral point clamped (NPC) rectifiers; especially the three-level NPC rectifier is widely used for medium voltage drives. Although a higher number of voltage levels can be achieved and the output voltage quality can be further improved by using four-level converters, one of the main concerns is the increasing number of devices used. For example, the four-level NPC rectifier needs 18 active switches and 12 power diodes, which greatly increases control complexity and degrades the system reliability due to the increased possibility of device failure.

Compared with the existing four-level rectifiers, the proposed four-level rectifier has less number of components, which is a great advantage for it. Overall, the proposed four-level rectifier and its bidirectional topology make the four-level converters bring in new blood for power electronic applications, especially for multilevel converters.

A three-phase double T-type four-level rectifier topology is proposed in this patent. Only four active switches and two diodes are utilized in each phase leg to achieve four output voltage levels. Compared with the three-phase four-level neutral point clamped (NPC) rectifier, two active switches and two diodes are reduced in each phase leg for the proposed four-level rectifier. Compared with the three-phase Vienna three-level rectifier, two active switches are increased in each phase leg for the proposed rectifier. However, the voltage stresses across all switches in the proposed rectifier is only a third of the DC link voltage, which is smaller than that in the Vienna three-level rectifier. Besides, one more voltage level is achieved, which means much smaller output voltage harmonic and lower dv/dt. It is a good alternative for low-voltage (<1 kV) applications, such as fast dc chargers for electric vehicles, telecom power supplies, uninterrupted power supply, etc. Furthermore, the corresponding bidirectional topology could be used in solar power generation systems as it could work as a grid-connected inverter.

FIG. 1 is a schematic view of a three phase four-level rectifier 100. A first phase 102a of the power source is shown as source 110 ($u_a$), which provides power to a first side of inductor winding 116 (La). A second side of inductor winding 116 (La) is connected to a first side of switch 140, a first side of diode 122 (Da1) and a first side of diode 124 (Da2). The inductor winding 116 (La) may be connected to an anode of diode 122 (Da1). The cathode of diode 122 (Da1) may be connected to a first side of capacitor 194 (C1).

The inductor winding 116 (La) may be connected to a first side of switch 140. Switch 140 may comprise a first transistor 142 (Sa1) and a second transistor 144 (Sa2). The first and second transistor 142, 144 may be MOSFET transistors (e.g. n-channel MOSFET or p-channel MOSFET), although other transistors such as IGBTs. The source of transistor 142 (Sa1) may be connected to the second side of inductor winding 116 (La). The gate of transistor 142 (Sa1) may be connected to a gate controller circuit. The drain of transistor 142 (Sa1) may be connected to the drain of transistor 144 (Sa2). The gate of transistor 144 (Sa2) may be connected to the gate controller circuit. The source of transistor 144 (Sa2) may be connected to switch 146 and switch 150.

Switch 146 may comprise transistor 148 such as a MOSFET (e.g. an n-channel MOSFET or p-channel MOSFET), although other transistors such as IGBTs. Transistor 148 (Sa3) may have a source connected to switch 140 (e.g. the source of transistor 144 (Sa2)). The gate of transistor 148 (Sa3) may be connected to the gate controller circuit. A drain of transistor 148 (Sa3) may be connected to a second side of capacitor 194 (C1) and a first side of capacitor 195 (C2).

Switch 150 may comprise transistor 152 such as a MOSFET (e.g. an n-channel MOSFET or p-channel MOSFET), although other transistors such as IGBTs. Transistor 152 (Sa4) may have a drain connected to switch 140 (e.g. the source of transistor 144 (Sa2)). The gate of transistor 152 (Sa4) may be connected to the gate controller circuit. A source of transistor 152 (Sa4) may be connected to a second side of capacitor 195 (C2) and a first side of capacitor 196 (C3).

The inductor winding 116 (La) may be connected to a cathode of diode 124 (Da2). The anode of diode 124 (Da2) may be connected to a second side of capacitor 196 (C3).

A second phase 102b of the power source is shown as source 112 ($u_b$), which provides power to a first side of inductor winding 118 (Lb). A second side of inductor winding 118 (Lb) is connected to a first side of switch 160, a first side of diode 126 (Db1) and a first side of diode 128 (Db2). The inductor winding 118 (Lb) may be connected to an anode of diode 126 (Db1). The cathode of diode 126 (Db1) may be connected to a first side of capacitor 194 (C1).

The inductor winding 118 (Lb) may be connected to a first side of switch 160. Switch 160 may comprise a first transistor 162 (Sb1) and a second transistor 164 (Sb2). The first and second transistor 162, 164 may be MOSFET transistors (e.g. n-channel MOSFET). The source of transistor 162 (Sb1) may be connected to the second side of inductor winding 118 (Lb). The gate of transistor 162 (Sb1) may be connected to the gate controller circuit. The drain of transistor 162 (Sb1) may be connected to the drain of transistor 164 (Sb2). The gate of transistor 164 (Sb2) may be connected to the gate controller circuit. The source of transistor 164 (Sb2) may be connected to switch 166 and switch 170.

Switch 166 may comprise transistor 168 such as a MOSFET (e.g. an n-channel MOSFET). Transistor 168 (Sb3) may have a source connected to switch 160 (e.g. the source of transistor 164 (Sb2)). The gate of transistor 168 (Sb3) may be connected to the gate controller circuit. A drain of transistor 168 (Sb3) may be connected to a second side of capacitor 194 (C1) and a first side of capacitor 195 (C2).

Switch 170 may comprise transistor 172 such as a MOSFET (e.g. an n-channel MOSFET). Transistor 172 (Sb4) may have a drain connected to switch 160 (e.g. the source of transistor 164 (Sb2)). The gate of transistor 172 (Sb4) may be connected to the gate controller circuit. A source of transistor 172 (Sb4) may be connected to a second side of capacitor 195 (C2) and a first side of capacitor 196 (C3).

The inductor winding 118 (Lb) may be connected to a cathode of diode 128 (Db2). The anode of diode 128 (Db2) may be connected to a second side of capacitor 196 (C3).

A third phase 102c of the power source is shown as source 114 ($u_c$), which provides power to a first side of inductor winding 120 (Lc). A second side of inductor winding 120 (Lc) is connected to a first side of switch 180, a first side of diode 130 (Dc1) and a first side of diode 132 (Dc2). The inductor winding 120 (Lc) may be connected to an anode of diode 130 (Dc1). The cathode of diode 130 (Dc1) may be connected to a first side of capacitor 194 (C1).

The inductor winding 120 (Lc) may be connected to a first side of switch 180. Switch 180 may comprise a first transistor 182 (Sc1) and a second transistor 184 (Sc2). The first and second transistor 182, 184 may be MOSFET transistors (e.g. n-channel MOSFET). The source of transistor 182 (Sc1) may be connected to the second side of inductor winding 120 (Lc). The gate of transistor 182 (Sc1) may be connected to a gate controller circuit. The drain of transistor 182 (Sc1) may be connected to the drain of transistor 184 (Sc2). The gate of transistor 184 (Sc2) may be connected to the gate controller circuit. The source of transistor 184 (Sc2) may be connected to switch 186 and switch 190.

Switch 186 may comprise transistor 188 such as a MOSFET (e.g. an n-channel MOSFET). Transistor 188 (Sc3) may have a source connected to switch 180 (e.g. the source of transistor 184 (Sc2)). The gate of transistor 188 (Sc3) may be connected to the gate controller circuit. A drain of transistor 188 (Sc3) may be connected to a second side of capacitor 194 (C1) and a first side of capacitor 195 (C2).

Switch 190 may comprise transistor 192 such as a MOSFET (e.g. an n-channel MOSFET). Transistor 192 (Sc4) may have a drain connected to switch 180 (e.g. the source of transistor 184 (Sc2)). The gate of transistor 192 (Sc4) may be connected to the gate controller circuit. A source of transistor 192 (Sc4) may be connected to a second side of capacitor 195 (C2) and a first side of capacitor 196 (C3).

The inductor winding 120 (Lc) may be connected to a cathode of diode 132 (Dc2). The anode of diode 132 (Dc2) may be connected to a second side of capacitor 196 (C3).

The first side of capacitor 194 (C1) is connected to an output, such as an output 106 (e.g., a positive output 106a) of the rectifier 100 and/or the first side of the load 198 (R). This forms a first voltage level (Udc). A second side of capacitor 194 (C1) is connected to a first side of capacitor 195 (C2), which forms a second voltage level (⅔ Udc). A second side of capacitor 195 (C2) is connected to a first side of capacitor 196 (C3), which forms a second voltage level (⅓ Udc). The second side of capacitor 196 (C3) is connected to an output, such as an output 106 (e.g., a negative output 106b) of the rectifier 100 and/or the second side of the load 198 (R), which forms a fourth voltage level (0).

The three-phase double T-type four-level rectifier is proposed in FIG. 1. However, for phase A in the proposed four-level rectifier in FIG. 1, besides the T-type network comprising of the diodes Da1, Da2, and the switches Sa1, Sa2, there is another T-type network comprising of the switches Sa1, Sa2, Sa3, Sa4. The two T-type networks share the same two switches Sa1, Sa2, which develop a bidirectional switch. The difference between the two T-type networks is that the dc link voltage of the first T-type network (Da1, Da2, Sa1, Sa2) is the whole DC link voltage of the proposed rectifier while the DC link voltage of the second T-type network (Sa1, Sa2, Sa3, Sa4) is the capacitor voltage of C2.

In the proposed rectifier, UC1, UC2, UC3 represent the capacitor voltages of C1, C2, C3; Udc represents the output dc link voltage; and ua, ub, uc represent the input three phase voltages. Besides, the three separate capacitors are required to have the same capacitance.

$$C_1 = C_2 = C_3 \quad (1)$$

In the proposed four-level rectifier, the maximum voltage stress across all the diodes is the whole dc link bus voltage, while all the power switches only need to withstand a third of the dc link bus voltage, i.e., ⅓Udc.

In the proposed four-level rectifier, the voltage stresses across the six power diodes are given as below $$u_{Dx1} = u_{Dx2} = U_{dc}(x=a,b,c) \quad (2)$$

The voltage stresses across all the switches are $$u_{Sx1} = u_{Sx2} = u_{Sx3} = u_{Sx4} = \frac{U_{dc}}{3} \quad (x = a, b, c) \quad (3)$$

Figure 2:
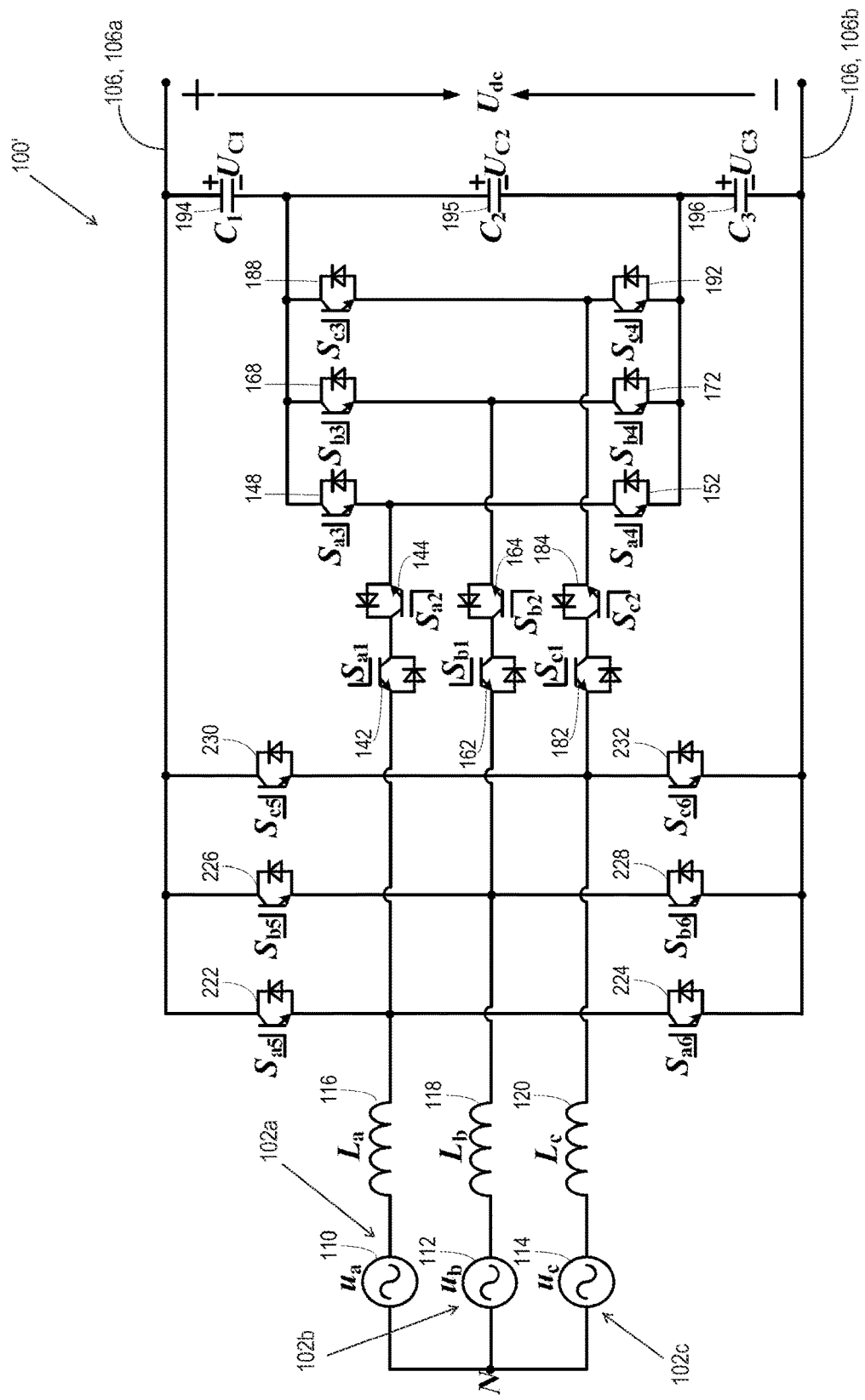
FIG. 2 is a schematic view of a three phase four-level bi-directional converter.

For the proposed four-level rectifier 100 in FIG. 1, the rectifier 100 is shown as a unidirectional converter due to the power diodes. If the six power diodes are replaced by active switches, a rectifier 100' configured as a bidirectional four-level converter can be developed as shown in FIG. 2. Transistors 222, 224, 226, 228, 230, and 232 of FIG. 2 replace the diodes 122, 124, 126, 128, 130, and 132 of FIG. 1. The collectors of transistors 222, 226, and 230 are connected to the first side of capacitor 194. The emitters of transistors 222, 226, and 230 are connected to inductor windings 116, 118, and 120, respectively. The emitters of transistors 222, 226, and 230 are connected to the second side of capacitor 196. The collectors of transistors 222, 226, and 230 are connected to inductor windings 116, 118, and 120, respectively. The gates of transistors 222, 224, 226, 228, 230, and 232 are connected to a gate controller circuit.

The modulation scheme of the bidirectional four-level converter 100' in FIG. 2 is the same as that of the unidirectional four-level rectifier 100 in FIG. 1. It should be noted that switch Sx5 is complementary to switch Sx2 and switch Sx6 is complementary to switch Sx1. With the bidirectional four-level converter 100', it could be used as an inverter which is suitable for solar or wind generation systems and low-voltage drives.

Figure 3A:
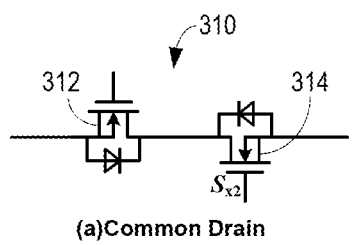
FIGS. 3A through 3F illustrate different switch implementations that may be used for each of the switches described in FIG. 1.
Figure 3B:
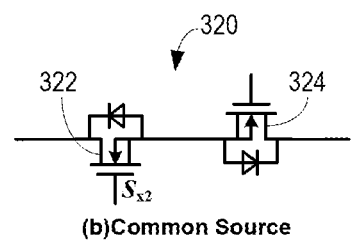

FIGS. 3A-F illustrate different switch implementations that may be used for each of the switches described in FIG. 1. In the proposed double T-type four-level rectifier, the bidirectional switch including Sx1, Sx2 (x=a, b, c) may have six different circuit configurations, as shown in FIGS. 3A-3F. For example, any of the switches 140, 160, 180 may be implemented as shown with regard to switches 310, 320, 330, 340, 350, or 360. As shown in FIG. 3A and FIG. 3B, the bidirectional switch could be common collector or common emitter. In the common drain configuration in FIG. 3A, switches Sx2 and Sx3 could share a same power supply and switches Sx1 and Sx5 could share a same power supply, while in the common source configuration in FIG. 3B, only switches Sx1 and Sx2 share a same power supply. Overall, both of the two configuration could help save design cost and improve power density as well.

FIG. 3A illustrates common drain bi-directional switch 310. Switch 310 may include a first transistor 312 and a second transistor 314. The first transistor 312 and the second transistor 314 may be MOSFET transistors (e.g. n-channel MOSFETs). The source of the first transistor 312 may be connected to the input. The drain of the first transistor 312 may be connected to the drain of the second transistor 314. The source of the second transistor may be connected to the output. The gate of the first transistor 312 and the second transistor 314 may be connected to a gate controller circuit.

FIG. 3B illustrates common source bi-directional switch 320. Switch 320 may include a first transistor 322 and a second transistor 324. The first transistor 322 and the second transistor 324 may be MOSFET transistors (e.g. n-channel MOSFETs). The drain of the first transistor 322 may be connected to the input. The source of the first transistor 322 may be connected to the source of the second transistor 324. The drain of the second transistor 324 may be connected to the output. The gate of the first transistor 322 and the second transistor 324 may be connected to a gate controller circuit.

Figure 3C:
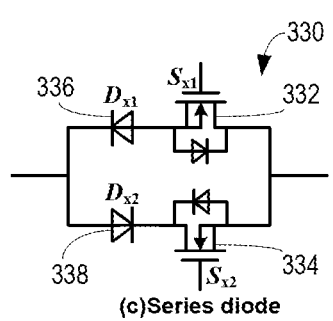

FIG. 3C illustrates a series diode configuration. The input of the switch 330 may be connected to cathode of diode 336 (Dx1) and an anode of diode 338 (Dx2). The anode of diode 336 (Dx1) may be connected to the source of transistor 332 (Sx1). The drain of transistor 332 (Sx1) may be connected to the output of switch 330. The cathode of diode 338 (Dx2) may be connected to the drain of transistor 334 (Sx2). The source of transistor 334 (Sx2) may be connected to the output of switch 330. The gates of transistors 332, 334 may be connected to a gate control circuit. The transistors 332, 334 may be MOSFET transistors. The current could flow from the left side to the right side through diode 338 (Dx2) to transistor 334 (Sx2). The current could also flow from the right side to the left side through transistor 332 (Sx1) to diode 336 (Dx1).

Figure 3D:
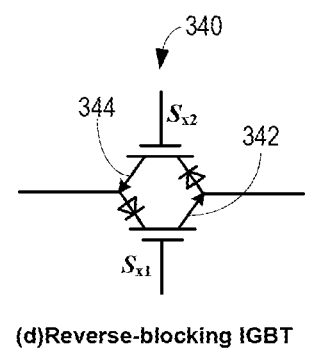

FIG. 3D illustrates an IGBT bi-directional switch 340. The reverse-blocking IGBTs (RB-IGBTs) shown in FIG. 3D is another bidirectional switch configuration for the proposed rectifier. The switch 340 may include a first transistor 342 and a second transistor 344. The first transistor 342 and the second transistor 344 may be IGBT transistors. The collector of the first transistor 342 and the emitter of the second transistor 344 may be connected to the input of switch 340. The emitter of the first transistor 342 and the collector of the second transistor 344 may be connected to the output of switch 340. The gate of the first transistor 342 and the gate of the second transistor 344 may be connected to a gate controller circuit.

Figure 3E:
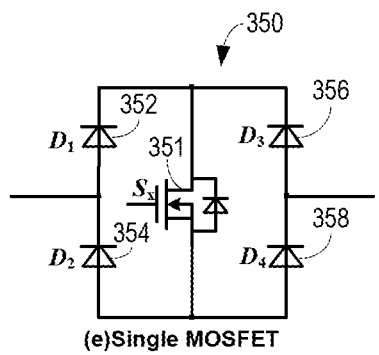
Figure 3F:
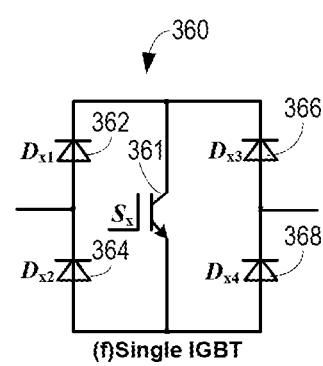

FIG. 3E and FIG. 3F illustrate common single transistor switch 330. As shown in FIG. 3C with the single switch configuration, three power switches could be reduced in total for its three-phase rectifier. However, twelve power diodes are necessary and conduction loss increases due to the increased power diodes.

In FIG. 3E, Switch 350 may include a transistor 351. The transistor 351 may be a MOSFET transistor (e.g. n-channel MOSFETs). The input of the switch 350 may be connected to an anode of a first diode 352 (Dx1) and a cathode second diode 354 (Dx2). The cathode of the first diode 352 (Dx1) may be connected to the drain of transistor 351 and a cathode of a third diode 356 (Dx3). The anode of the second diode 354 (Dx2) may be connected to the source of transistor 351 and an anode of a fourth diode 358 (Dx4). The output of switch 350 may be connected to the anode of the third diode 356 (Dx3) and the cathode of the fourth diode 358 (Dx4). The gate of the transistor 351 may be connected to a gate controller circuit.

In FIG. 3F, Switch 360 may include a transistor 361. The transistor 361 may be an IGBT transistor. The input of the switch 360 may be connected to an anode of a first diode 362 (Dx1) and a cathode second diode 364 (Dx2). The cathode of the first diode 362 (Dx1) may be connected to the emitter of transistor 361 and a cathode of a third diode 366 (Dx3). The anode of the second diode 364 (Dx2) may be connected to the collector of transistor 361 and an anode of a fourth diode 368 (Dx4). The output of switch 360 may be connected to the anode of the third diode 366 (Dx3) and the cathode of the fourth diode 368 (Dx4). The gate of the transistor 361 may be connected to a gate controller circuit.

Figure 4:
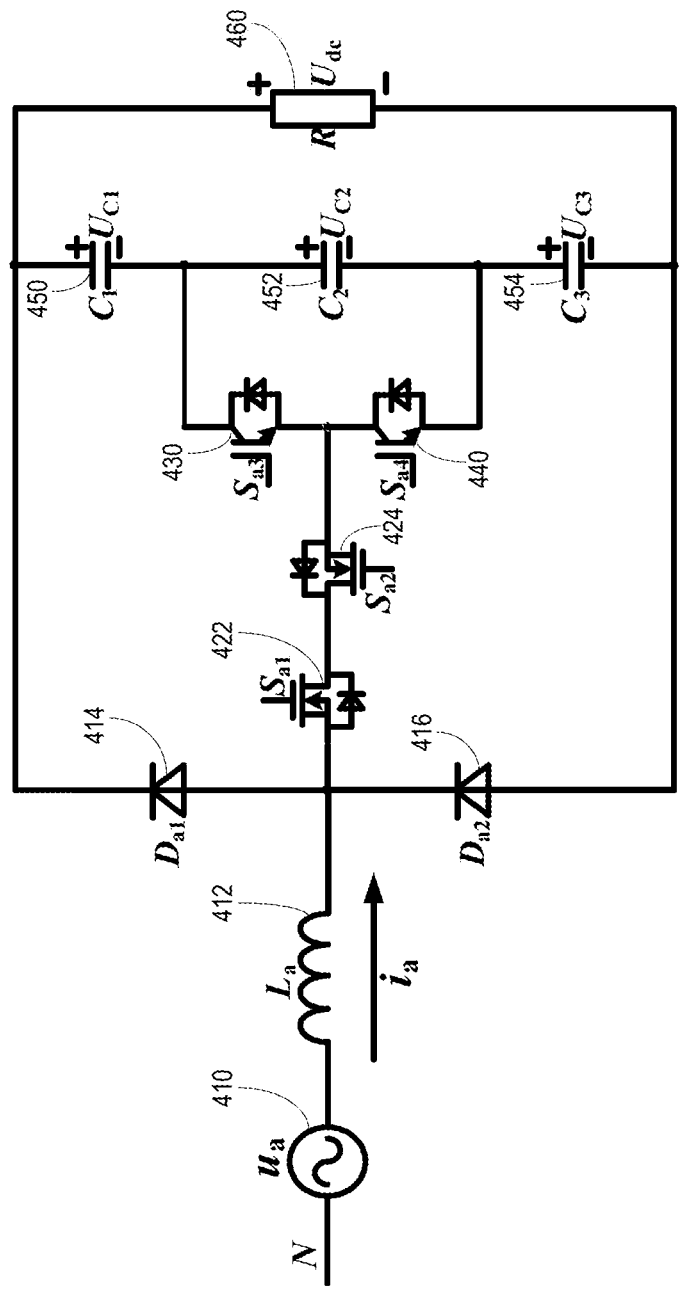
FIG. 4 is a schematic view of one implementation of one phase of the four-level rectifier described in FIG. 1.

FIG. 4 is a schematic view of one implementation of one phase of the four-level rectifier described in FIG. 1. The power source is shown as source 410 ($u_a$) provides power to a first side of inductor winding 412 (La). A second side of inductor winding 412 (La) is connected to a first side of a first switch, a first side of diode 414 (Da1) and a first side of diode 416 (Da2). The inductor winding 412 (La) may be connected to an anode of diode 414 (Da1). The cathode of diode 414 (Da1) may be connected to a first side of capacitor 450 (C1).

The inductor winding 412 (La) may be connected to a first side of the first switch. The first switch may comprise a first transistor 422 (Sa1) and a second transistor 424 (Sa2). The first and second transistor 422, 424 may be MOSFET transistors (e.g. n-channel MOSFET). The source of transistor 422 (Sa1) may be connected to the second side of inductor winding 412 (La). The gate of transistor 422 (Sa1) may be connected to a gate controller circuit. The drain of transistor 422 (Sa1) may be connected to the drain of transistor 424 (Sa2). The gate of transistor 424 (Sa2) may be connected to the gate controller circuit. The source of transistor 424 (Sa2) may be connected to second switch and third switch.

The second switch may comprise transistor 430 such as an IGBT. Transistor 430 (Sa3) may have a collector connected to the first switch (e.g. the source of transistor 424 (Sa2)). The gate of transistor 430 (Sa3) may be connected to the gate controller circuit. The emitter of transistor 430 (Sa3) may be connected to a second side of capacitor 450 (C1) and a first side of capacitor 452 (C2).

The third switch may comprise transistor 440 such as an IGBT. Transistor 440 (Sa4) may have a collector connected to the first switch (e.g. the source of transistor 424 (Sa2)). The gate of transistor 440 (Sa4) may be connected to the gate controller circuit. A source of transistor 440 (Sa4) may be connected to a second side of capacitor 452 (C2) and a first side of capacitor 454 (C3).

The inductor winding 412 (La) may be connected to a cathode of diode 416 (Da2). The anode of diode 416 (Da2) may be connected to a second side of capacitor 454 (C3).

The first side of capacitor 450 (C1) is connected to an output such as the a first side of the load 460 (R). This forms a first voltage level (Udc). A second side of capacitor 450 (C1) is connected to a first side of capacitor 452 (C2), which forms a second voltage level (⅔ Udc). A second side of capacitor 450 (C2) is connected to a first side of capacitor 454 (C3), which forms a third voltage level (⅓ Udc). A second side of capacitor 454 (C3) is connected to an output such as a second side of the load 460 (R), which forms a third voltage level (0).

Figure 5A:
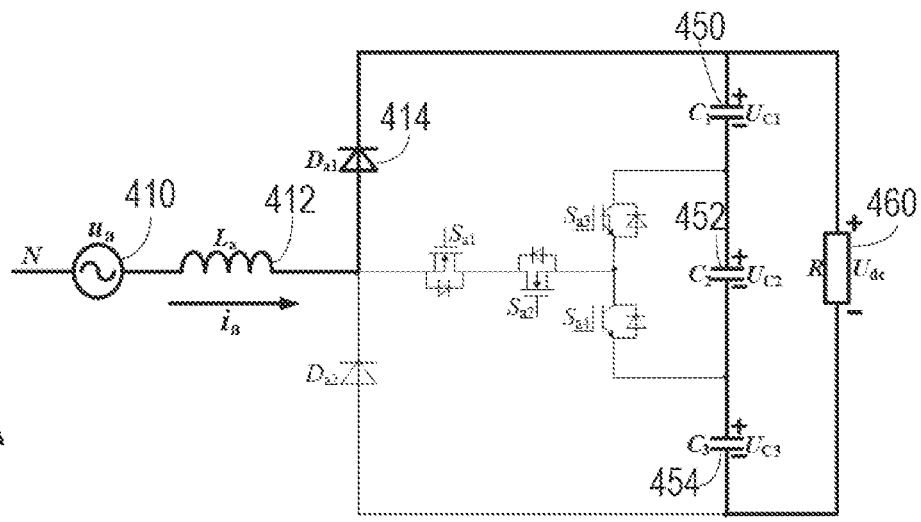
FIGS. 5A through 5F illustrate the current path for the rectifier at each voltage level.
Figure 5B:
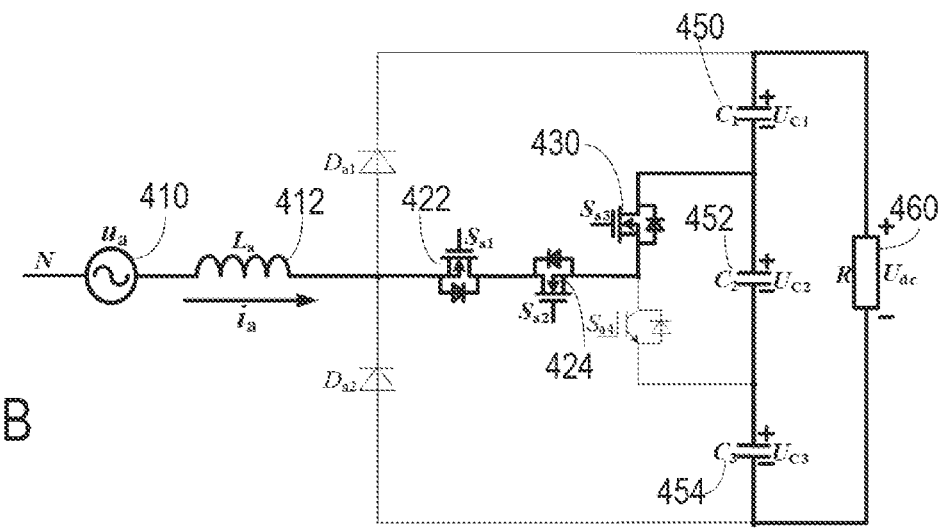
Figure 5C:
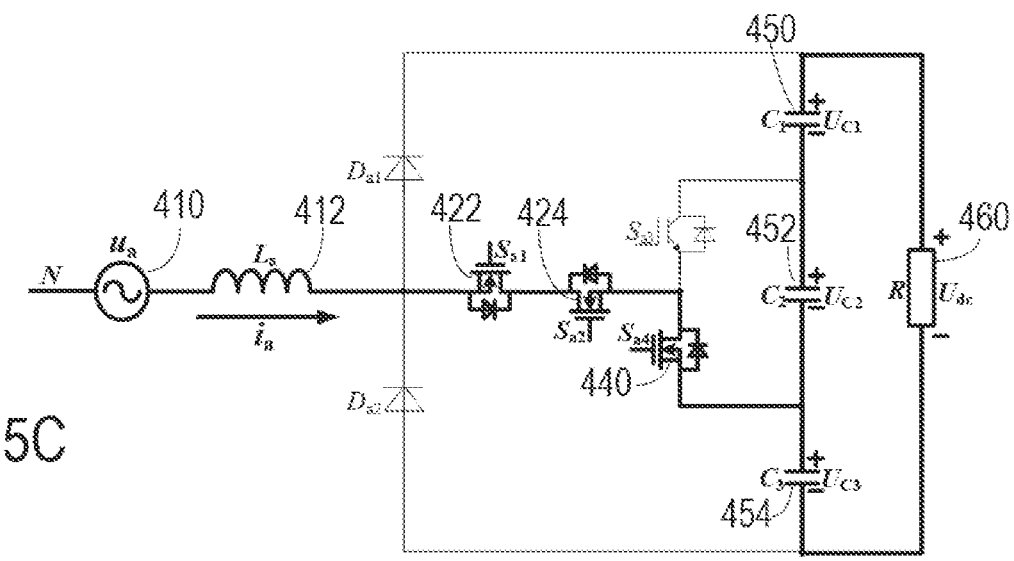
Figure 5D:
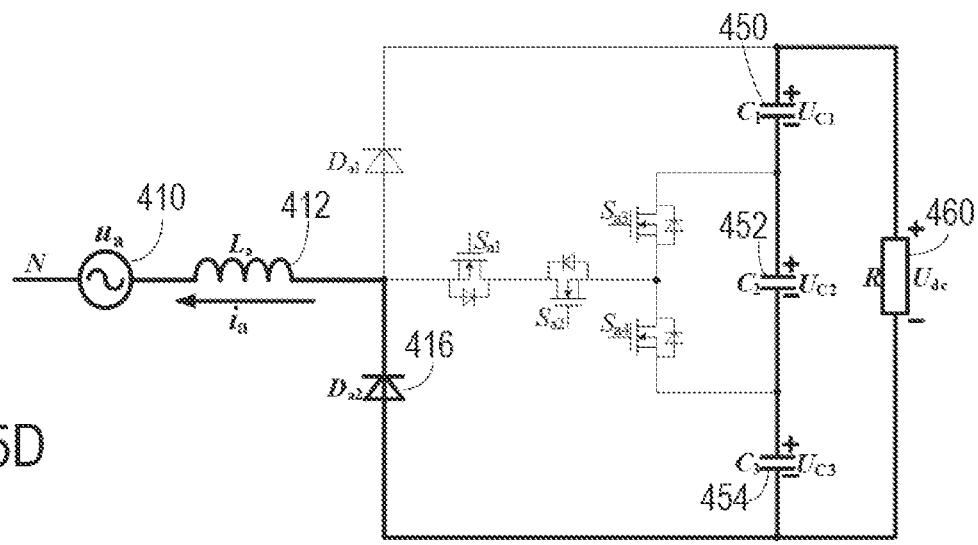
Figure 5E:
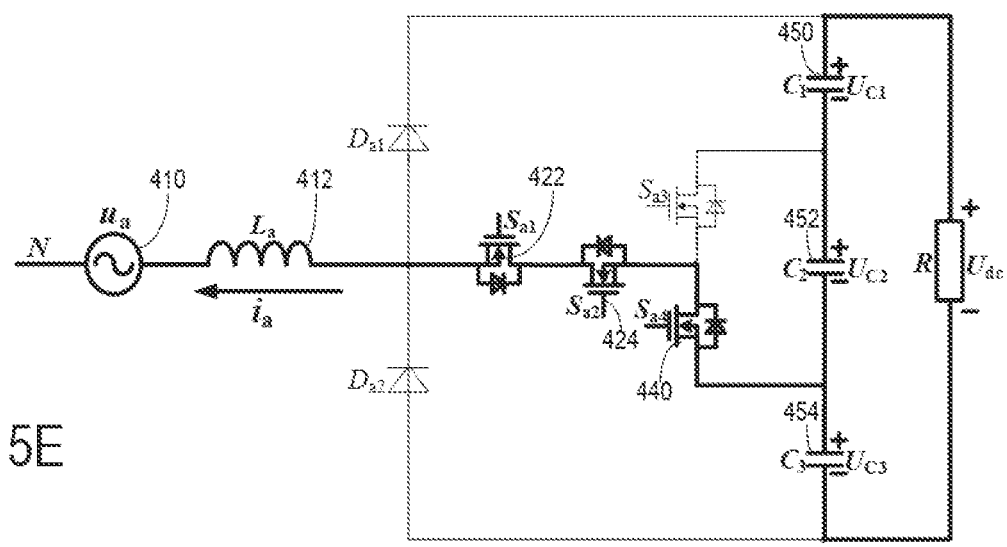
Figure 5F:
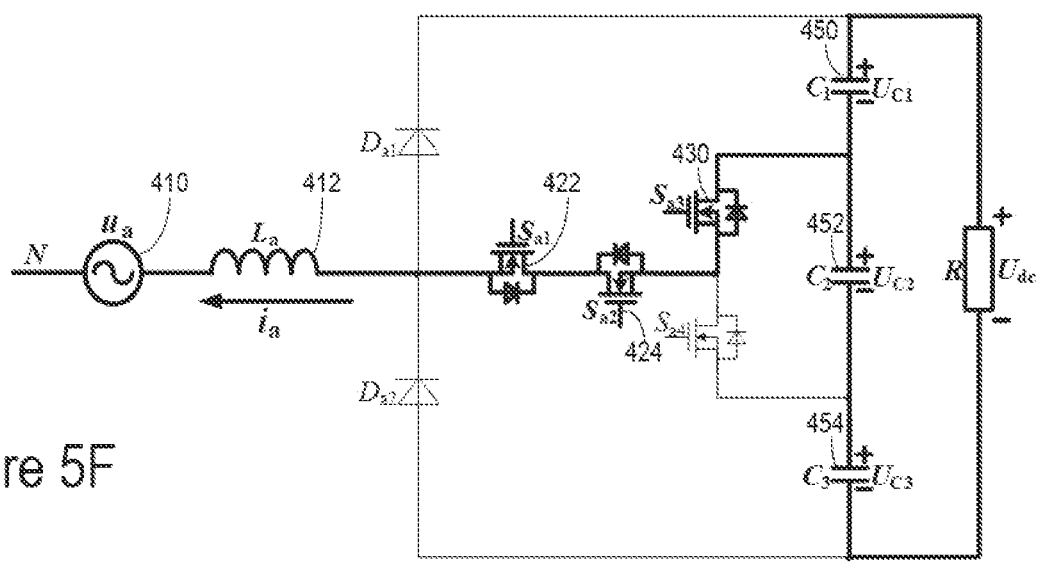

Table I summarizes the switching states in different voltage levels. Besides, taking phase A as an example, the conduction paths of switches in phase A and corresponding output voltage levels are presented in FIGS. 5A-5F. It can be found that the bidirectional switches (Sx1, Sx2) are turned on in both the two voltage levels ⅔Udc and ⅓Udc, to make sure an effective commutation from the voltage level ⅔Udc to the adjacent voltage level ⅓Udc, especially during dead-time period for switches Sx3, Sx4. FIGS. 5A-5C illustrate the output voltage levels Udc, ⅔Udc and ⅓Udc with the current flowing from the input terminal to the output terminal, while FIGS. 5D-5F illustrate the voltage levels 0, ⅔Udc and ⅓Udc with the current flowing from the output terminal to the input terminal.

TABLE I

| | Switching states | | | | | |
|---|---|---|---|---|---|---|
| | Switches | | | | | |
| Voltage Levels | $S_{x1}$ | $S_{x2}$ | $S_{x3}$ | $S_{x4}$ | $D_{x1}$ | $D_{x2}$ |
| $U_{dc}$ | 0 | 0 | 0 | 0 | 1 | 0 |
| $2/3 U_{dc}$ | 1 | 1 | 1 | 0 | 0 | 0 |
| $1/3 U_{dc}$ | 1 | 1 | 0 | 1 | 0 | 0 |
| 0 | 0 | 0 | 0 | 0 | 0 | 1 |

FIG. 5A illustrates the current path for the rectifier at the first level (Udc). The current flows from the inductor winding 412 (La) through the diode 414 (Da1) to the first side of the capacitor 450 (C1), then to the load 460 (R).

FIG. 5B and FIG. 5F illustrate the current path for the rectifier at the second level (⅔ Udc). In FIG. 5B, the current flows from the inductor winding 412 (La) through first switch and the second switch. As such, the current flows through transistor 422 to transistor 424, then from transistor 424 to transistor 430, and from transistor 430 to the second side of the capacitor 450 (C1) and the first side of capacitor 452 (C2), then to the load 460 (R). In FIG. 5F, the current is contrary to the current in FIG. 5B.

FIG. 5C and FIG. 5E illustrate the current path for the rectifier at the third level (⅓ Udc). In FIG. 5C, the current flows from the inductor winding 412 (La) through first switch and the third switch. As such, the current flows through transistor 422 to transistor 424, then from transistor 424 to transistor 440, and from transistor 440 to the second side of the capacitor 452 (C2) and the first side of capacitor 454 (C3), then to the load 460 (R). In FIG. 5E, the current is contrary to the current in FIG. 5C.

FIG. 5D illustrates the current path for the rectifier at the fourth level (0). The current flows from the inductor winding 412 (La) through the diode 416 (Da2) to the second side of the capacitor 454 (C3), then to the load 460 (R).

Figure 6:
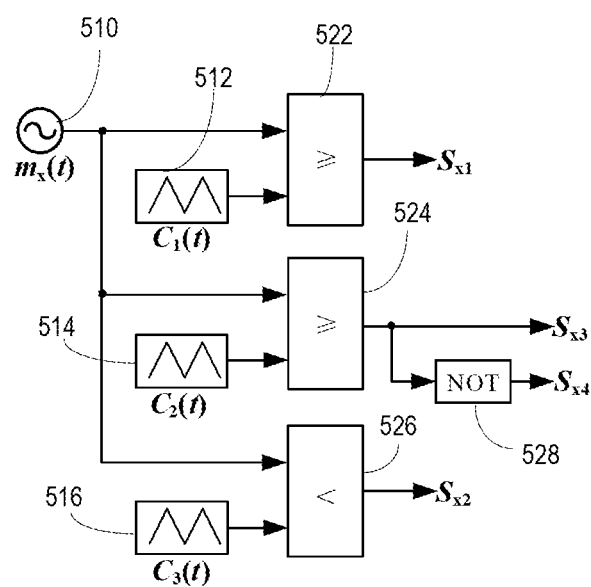
FIG. 6 illustrates one implementation of the gate control logic for driving the circuit of FIG. 1.

FIG. 6 illustrates one implementation of the gate control logic for driving the circuit of FIG. 1. The voltage source 510 provides an input function of Mx(t). The gate control uses three triangle control waves (C1(t), C2(t), C3(t)) that are offset from one another. An output from the voltage source 510 (Mx(t)) is compared with output of a first control generator 512 (C1(t)). When Mx(t) is greater than or equal to C1(t) in logic block 522, the gate of Sx1 is activated. When Mx(t) is not greater than or equal to C1(t) in logic block 522, the gate of Sx1 is deactivated.

An output from the voltage source 510 (Mx(t)) is compared with output of a second control generator 514 (C2(t)). When Mx(t) is greater than or equal to C2(t) in logic block 524, the gate of Sx3 is activated and the gate of Sx4 is deactivated. When Mx(t) is not greater than or equal to C2(t) in logic block 524, the gate of Sx3 is deactivated and the gate of Sx4 is activated.

An output from the voltage source 510 (Mx(t)) is compared with output of a third control generator 516 (C3(t)). When Mx(t) is less than C3(t) in logic block 526, the gate of Sx2 is activated. When Mx(t) is not less than C3(t) in logic block 526, the gate of Sx2 is deactivated.

Figure 7:
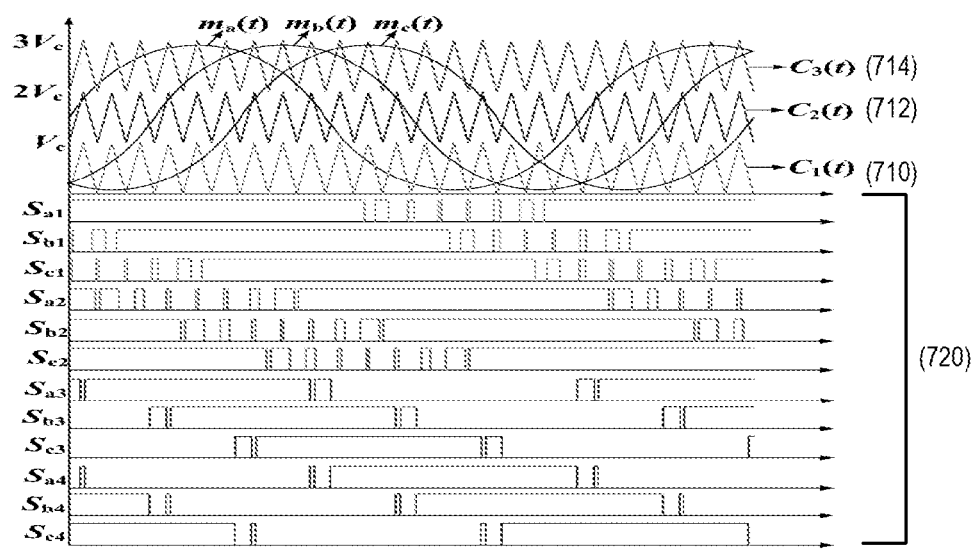
FIG. 7 is a chart illustrating the timing of control signals for the rectifier of FIG. 1.

FIG. 7 is a chart illustrating the timing of control signals for the rectifier of FIG. 1. The chart includes the first control signal 710 C1(t), the second control signal 712 C2(t), the third control signal 714 C3(t), and the output of the gate control logic for each transistor as provided in timing diagram 720. The first control signal 710 C1(t), the second control signal 712 C2(t), the third control signal 714 C3(t) are provided to the logic as described in FIG. 6. to produce the gate timing shown at 720.

For the proposed four-level rectifier, a carrier-based modulation scheme may be used. The three reference signals ma(t), mb(t) and mc(t) may be compared with three triangular carrier signals C1(t), C2(t) and C3(t) to produce drive signals for the switches. C1(t), C2(t) and C3(t) may have the same carrier frequency fs and amplitude Vc and may be in phase with an offset value that is equivalent to Vc.

$$\begin{cases} m_a(t) = V_m \sin(2\pi f_m t) + \dfrac{3V_c}{2} \\ m_b(t) = V_m \sin\left(2\pi f_m t - \dfrac{2\pi}{3}\right) + \dfrac{3V_c}{2} \\ m_c(t) = V_m \sin\left(2\pi f_m t + \dfrac{2\pi}{3}\right) + \dfrac{3V_c}{2} \end{cases} \quad (4)$$

Vm is the peak amplitude of the reference signal and fm is the fundamental frequency. Thus, the modulation index m for this rectifier can be defined by $$m = \dfrac{2V_m}{3V_c} \quad (5)$$

Figure 8:
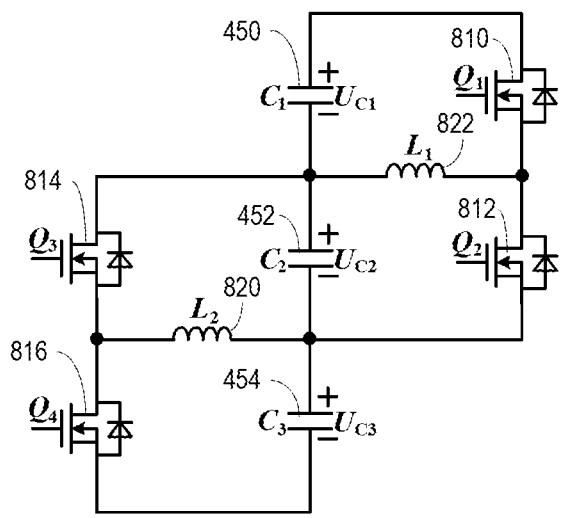
FIG. 8 is a schematic view of a balancing circuit.

FIG. 8 is a schematic view of a balancing circuit. A drain of transistor 810 (Q1) is connected to the first side of capacitor 450. A source of transistor 810 (Q1) is connected to the second side of capacitor 450 (C1) and a first side of capacitor 452 (C2) through inductor 822 (L1). The drain of transistor 812 (Q2) is connected to the second side of capacitor 450 (C1) and a first side of capacitor 452 (C2) through inductor 822 (L1). The source of transistor 812 (Q2) is connected to the second side of capacitor 452 (C2) and the first side of capacitor 454 (C3). A drain of transistor 814 (Q3) is connected to a second side of capacitor 450 (C1) and a first side of capacitor 452 (C2). A source of transistor 814 (Q3) is connected to a second side for capacitor 452 (C2) and a first side of capacitor 454 (C3) through inductor 820 (L2). The drain of transistor 816 (Q4) is connected to the second side for capacitor 452 (C2) and a first side of capacitor 454 (C3) through inductor 820 (L2). The source of transistor 816 (Q4) is connected to the second side of capacitor 454 (C3). The gates of transistors 810 (Q1), 812 (Q2), 814 (Q3), and 816 (Q4) may be connected to the gate control circuit.

One very challenging issue is the voltage-balance control for the three DC-link capacitor voltages. A voltage balance circuit may be utilized to realize voltage balance for the proposed rectifier. The first buck/boost converter comprising of $L_1$, $Q_1$ and $Q_2$ is utilized to balance the capacitor voltages of $C_1$ and $C_2$, and the other buck/boost converter comprising of $L_2$, $Q_3$ and $Q_4$ is utilized to balance the capacitor voltages of $C_2$ and $C_3$. The switches $Q_1$ and $Q_2$ are complementary to each other and the switches $Q_3$ and $Q_4$ are complementary to each other as well. Besides, the switches $Q_1$ and $Q_3$ are complementary to each other. A voltage-oriented control strategy may be used to implement a closed-loop control.

Figure 9:
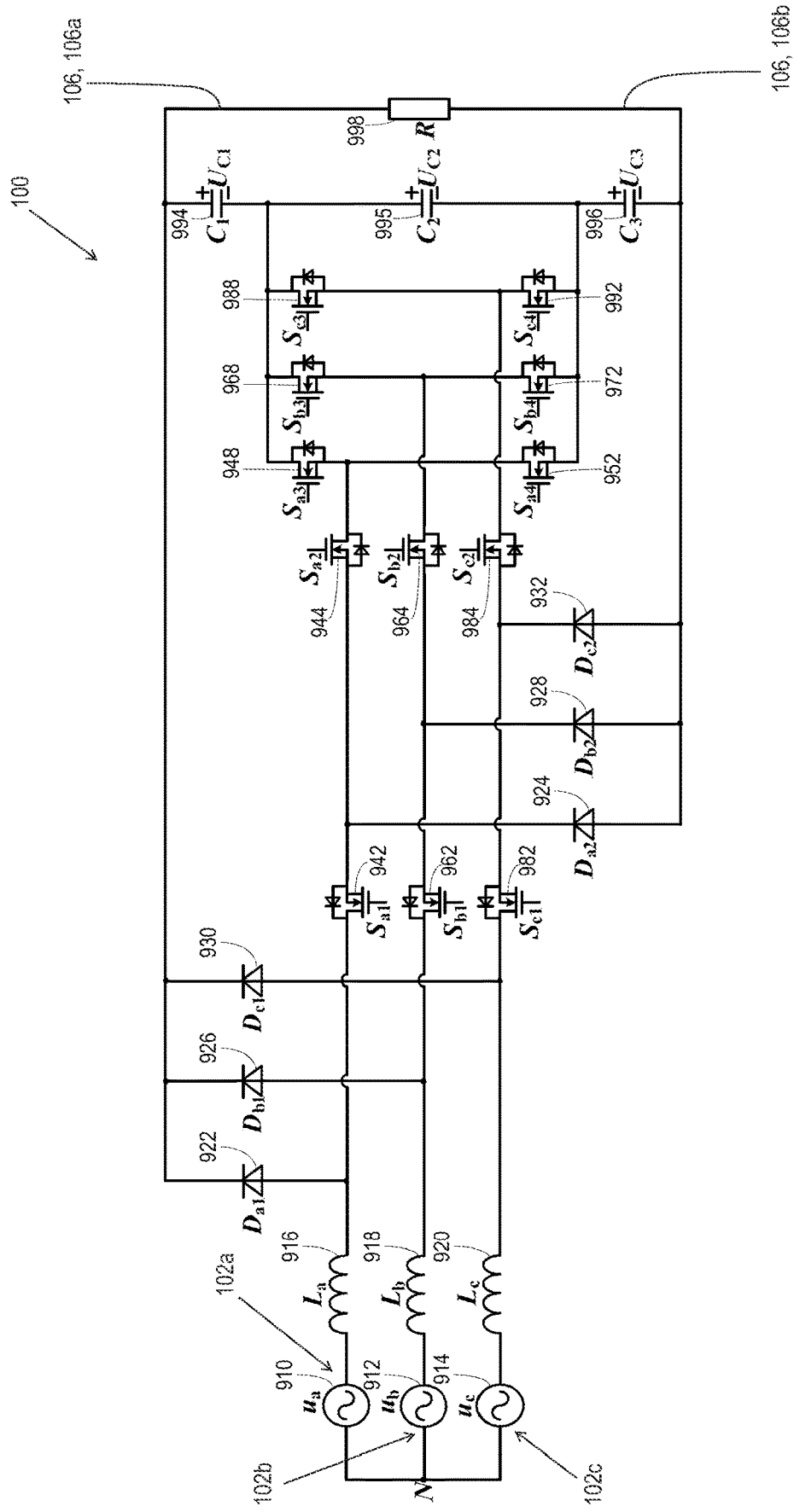
FIG. 9 is a schematic view of another implementation of a three phase four-level rectifier.
Figure 10:
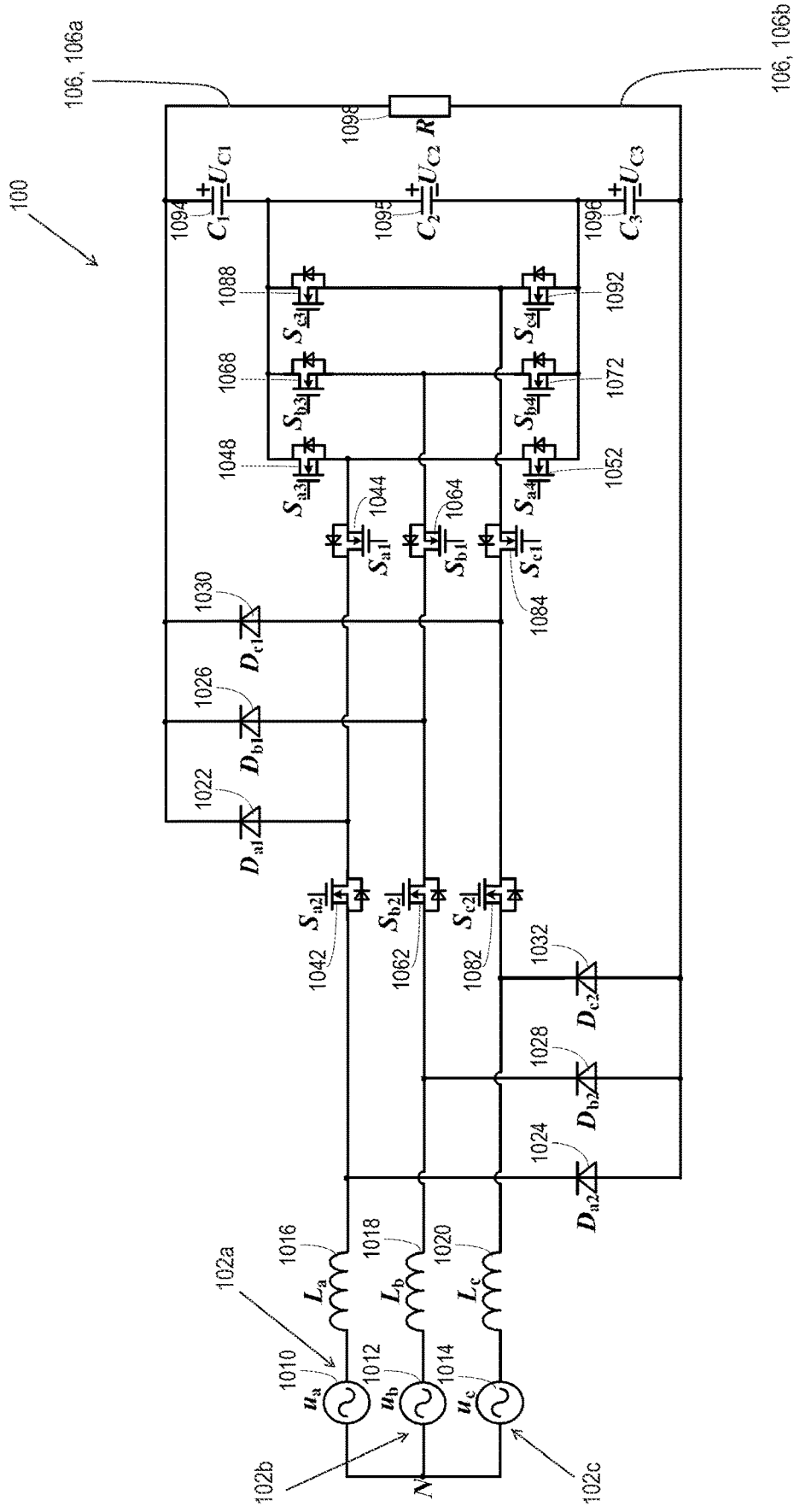
FIG. 10 is a schematic view of yet another implementation of a three phase four-level rectifier.

It can be seen that FIG. 9 is an improved version of FIG. 1 with diode $D_{a2}$ placed between $S_{a1}$ and $S_{a2}$. Besides, FIG. 10 is an improved version of a drain to drain implementation with diode $D_{a1}$ placed between $S_{a1}$ and $S_{a2}$.

Taking phase A as an example, the switching states of the rectifier at the four different voltage levels of $U_{dc}$, $\frac{2}{3}U_{dc}$, $\frac{1}{3}U_{dc}$ and 0 are summarized in Table II.

TABLE II

Figure 11A:
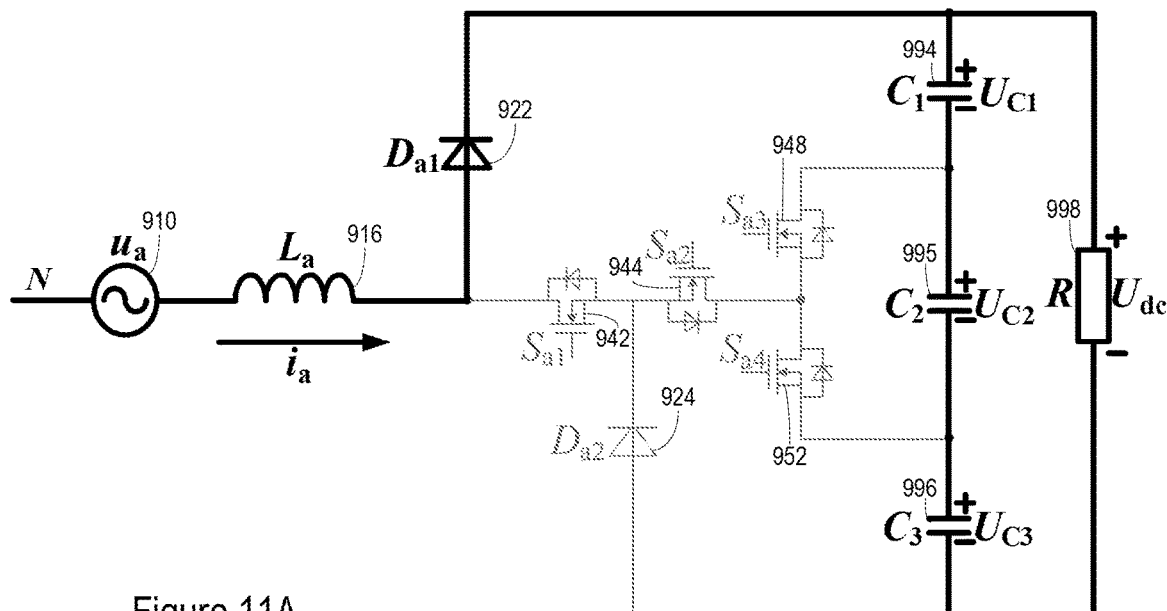
FIGS. 11A through 11F illustrate the current path for the rectifier at each voltage level.
Figure 11B:
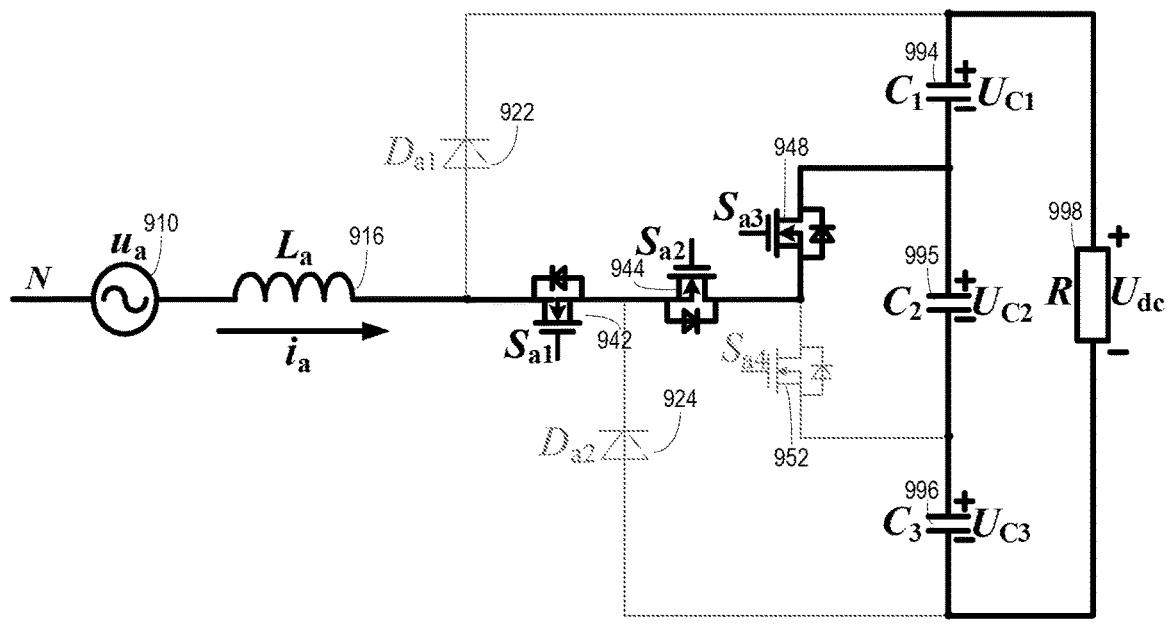
Figure 11C:
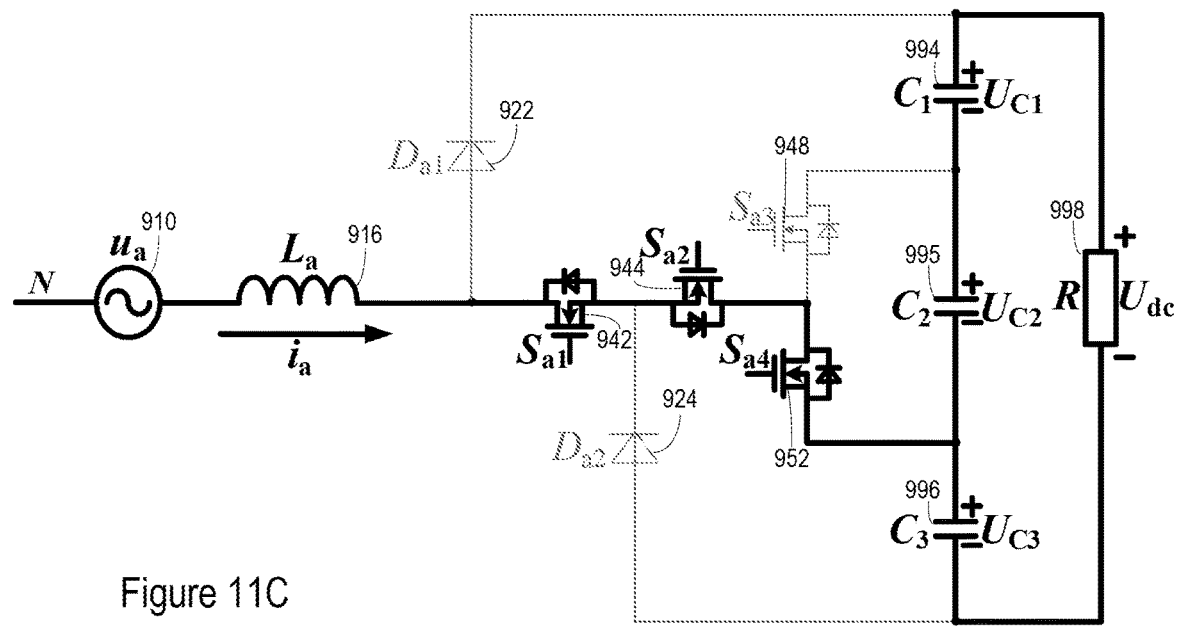
Figure 11D:
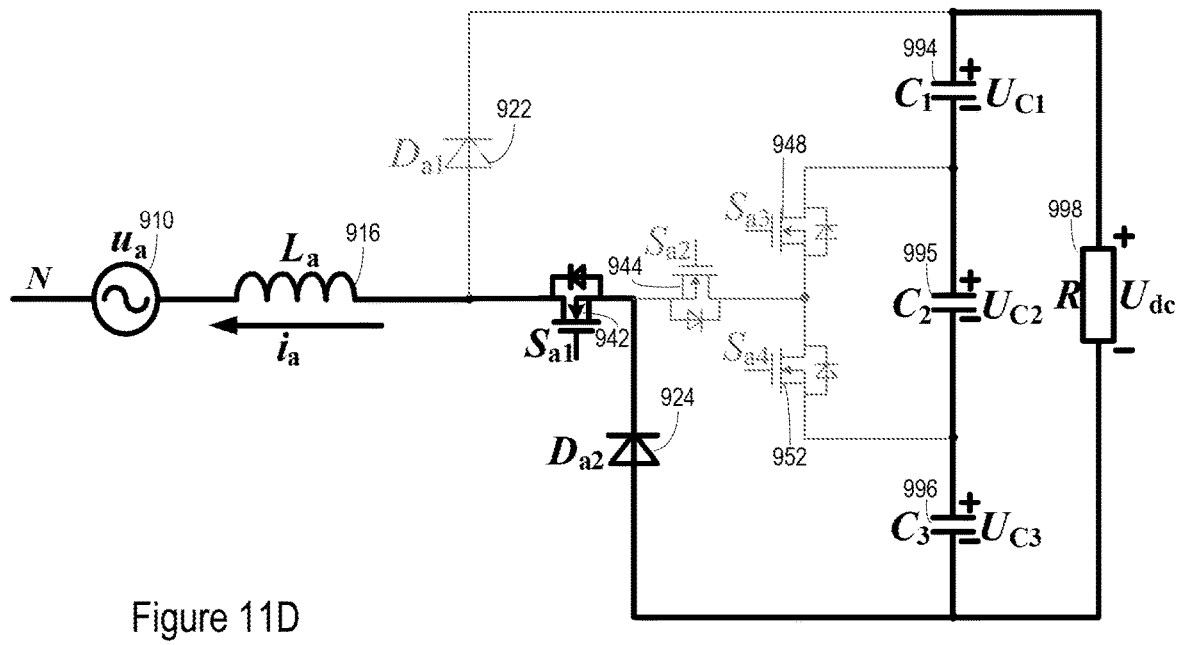
Figure 11E:
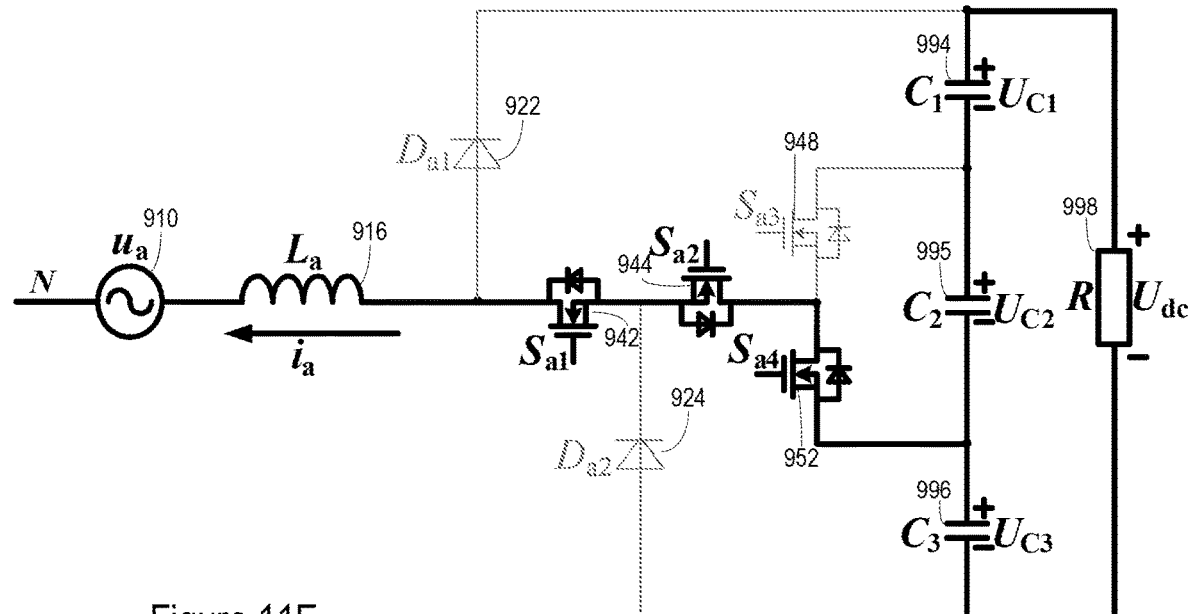
Figure 11F:
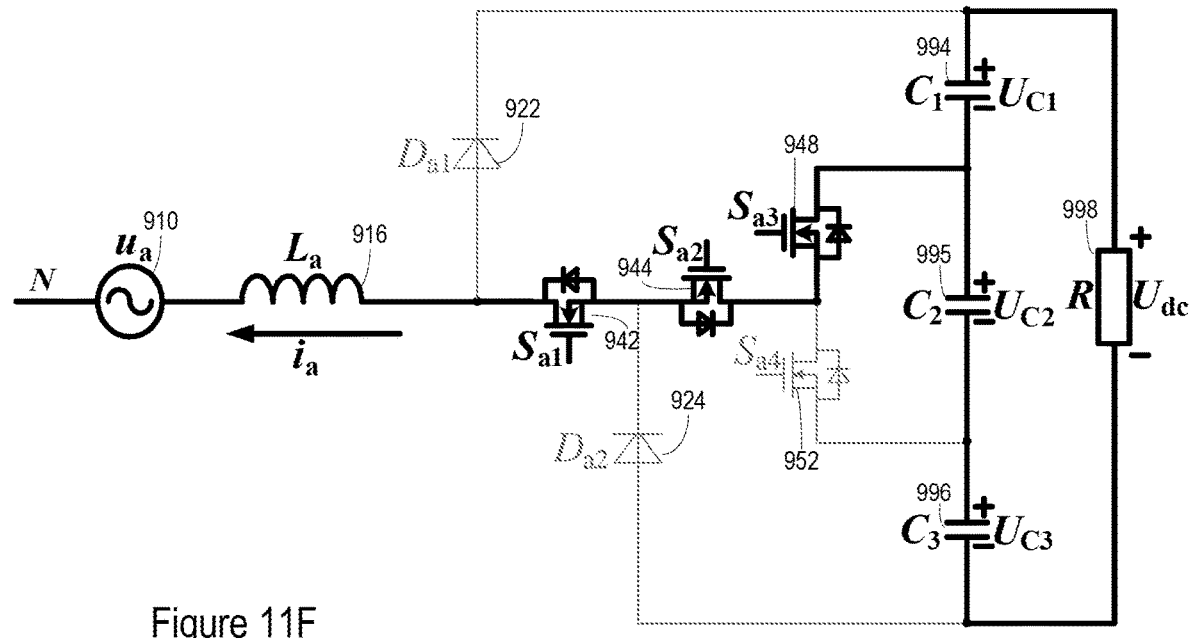

| | Switching states | | | | | |
|---|---|---|---|---|---|---|
| Voltage | | Switch | | | | |
| Level | State | $S_{a1}$ | $S_{a2}$ | $S_{a3}$ | $S_{a4}$ | $D_{a1}$ $D_{a2}$ |
| $U_{dc}$ | FIG. 11A | 0 | 0 | 0 | 0 | 1 0 |
| $2/3U_{dc}$ | FIG. 11B, FIG. 11F | 1 | 1 | 1 | 0 | 0 0 |
| $1/3U_{dc}$ | FIG. 11C, FIG. 11E | 1 | 1 | 0 | 1 | 0 0 |
| 0 | FIG. 11D | 0 | 0 | 0 | 0 | 0 1 |

The conduction paths of switches in phase A and the corresponding output voltage levels are presented in FIG. 11. It can be found that the bidirectional switches ($S_{a1}$, $S_{a2}$) are turned on for achieving the two voltage levels $\frac{2}{3}U_{dc}$ and $\frac{1}{3}U_{dc}$, and to ensure an effective commutation from the voltage level $\frac{2}{3}U_{dc}$ to the adjacent voltage level $\frac{1}{3}U_{dc}$, especially during the dead-time period for switches $S_{a3}$ and $S_{a4}$. FIG. 11(a)-(c) illustrate the output voltage levels Udc, $\frac{2}{3}U_{dc}$ and $\frac{1}{3}U_{dc}$ with the current flowing from the input terminal to the output terminal, while FIG. 11(d)-(f) illustrate the voltage levels 0, $\frac{2}{3}U_{dc}$ and $\frac{1}{3}U_{dc}$ with the current flowing from the output terminal to the input terminal.

FIG. 9 and FIG. 10 are improved versions of the implementations discussed with regard to FIG. 1 and FIG. 2, respectively. Like FIG. 1, all the power switches only need to withstand a third of the dc-link bus voltage. For FIG. 9, the voltage stresses across diodes are $$u_{Dx1} = U_{dc} (x=a,b,c)$$

$$u_{Dx2} = \tfrac{2}{3} U_{dc} (x=a,b,c) \quad (3)$$

For FIG. 10, the voltage stresses across diodes are $$u_{Dx1} = 2/3 U_{dc} (x=a,b,c)$$

$$u_{Dx2} = U_{dc} (x=(a,b,c) \quad (4)$$

FIG. 9 is a schematic view of a three phase four-level rectifier 100. A first phase 102a of the power source is shown as source 910 ($u_a$), which provides power to a first side of inductor winding 916 (La). A second side of inductor winding 916 (La) is connected to a first side of switch 940 and a first side of diode 922 (Da1). The inductor winding 916 (La) may be connected to an anode of diode 922 (Da1). The cathode of diode 922 (Da1) may be connected to a first side of capacitor 994 (C1).

The inductor winding 916 (La) may be connected to a first side of switch 940. Switch 940 may comprise a first transistor 942 (Sa1) and a second transistor 944 (Sa2). The first and second transistor 942, 944 may be MOSFET transistors (e.g. n-channel MOSFET or p-channel MOSFET), although other transistors such as IGBTs. The drain of transistor 942 (Sa1) may be connected to the second side of inductor winding 916 (La). The gate of transistor 942 (Sa1) may be connected to a gate controller circuit. The source of transistor 942 (Sa1) may be connected to the source of transistor 944 (Sa2). The gate of transistor 944 (Sa2) may be connected to the gate controller circuit. The drain of transistor 944 (Sa2) may be connected to switch 946 and switch 950.

Switch 946 may comprise transistor 948 such as a MOSFET (e.g. an n-channel MOSFET or p-channel MOSFET), although other transistors such as IGBTs. Transistor 948 (Sa3) may have a source connected to switch 940 (e.g. the drain of transistor 944 (Sa2)). The gate of transistor 948 (Sa3) may be connected to the gate controller circuit. A drain of transistor 948 (Sa3) may be connected to a second side of capacitor 994 (C1) and a first side of capacitor 995 (C2).

Switch 950 may comprise transistor 952 such as a MOSFET (e.g. an n-channel MOSFET or p-channel MOSFET), although other transistors such as IGBTs. Transistor 952 (Sa4) may have a drain connected to switch 940 (e.g. the drain of transistor 944 (Sa2)). The gate of transistor 952 (Sa4) may be connected to the gate controller circuit. A source of transistor 952 (Sa4) may be connected to a second side of capacitor 995 (C2) and a first side of capacitor 996 (C3).

The source of transistor 942 (Sa1) of may be connected to a cathode of diode 924 (Da2). The anode of diode 924 (Da2) may be connected to a second side of capacitor 996 (C3).

A second phase 102b of the power source is shown as source 912 ($ub$), which provides power to a first side of inductor winding 918 (Lb). A second side of inductor winding 918 (Lb) is connected to a first side of switch 960 and a first side of diode 926 (Db1). The inductor winding 918 (Lb) may be connected to an anode of diode 926 (Db1). The cathode of diode 926 (Db1) may be connected to a first side of capacitor 994 (C1).

The inductor winding 918 (Lb) may be connected to a first side of switch 960. Switch 960 may comprise a first transistor 962 (Sb1) and a second transistor 964 (Sb2). The first and second transistor 962, 964 may be MOSFET transistors (e.g. n-channel MOSFET). The drain of transistor 962 (Sb1) may be connected to the second side of inductor winding 918 (Lb). The gate of transistor 962 (Sb1) may be connected to the gate controller circuit. The source of transistor 962 (Sb1) may be connected to the source of transistor 964 (Sb2). The gate of transistor 164 (Sb2) may be connected to the gate controller circuit. The drain of transistor 964 (Sb2) may be connected to switch 966 and switch 970.

Switch 966 may comprise transistor 968 such as a MOSFET (e.g. an n-channel MOSFET). Transistor 968 (Sb3) may have a source connected to switch 960 (e.g. the drain of transistor 964 (Sb2)). The gate of transistor 968 (Sb3) may be connected to the gate controller circuit. A drain of transistor 968 (Sb3) may be connected to a second side of capacitor 994 (C1) and a first side of capacitor 995 (C2).

Switch 970 may comprise transistor 972 such as a MOSFET (e.g. an n-channel MOSFET). Transistor 972 (Sb4) may have a drain connected to switch 960 (e.g. the drain of transistor 964 (Sb2)). The gate of transistor 972 (Sb4) may be connected to the gate controller circuit. A source of transistor 972 (Sb4) may be connected to a second side of capacitor 995 (C2) and a first side of capacitor 996 (C3).

The source of transistor 962 (Sb1) may be connected to a cathode of diode 928 (Db2). The anode of diode 928 (Db2) may be connected to a second side of capacitor 996 (C3).

A third phase 102c of the power source is shown as source 914 ($u_c$), which provides power to a first side of inductor winding 920 (Lc). A second side of inductor winding 920 (Lc) is connected to a first side of switch 980 and a first side of diode 930 (Dc1). The inductor winding 920 (Lc) may be connected to an anode of diode 930 (Dc1). The cathode of diode 930 (Dc1) may be connected to a first side of capacitor 994 (C1).

The inductor winding 920 (Lc) may be connected to a first side of switch 980. Switch 980 may comprise a first transistor 982 (Sc1) and a second transistor 984 (Sc2). The first and second transistor 982, 984 may be MOSFET transistors (e.g. n-channel MOSFET). The drain of transistor 982 (Sc1) may be connected to the second side of inductor winding 920 (Lc). The gate of transistor 982 (Sc1) may be connected to a gate controller circuit. The source of transistor 982 (Sc1) may be connected to the source of transistor 984 (Sc2). The gate of transistor 984 (Sc2) may be connected to the gate controller circuit. The drain of transistor 984 (Sc2) may be connected to switch 986 and switch 990.

Switch 986 may comprise transistor 988 such as a MOSFET (e.g. an n-channel MOSFET). Transistor 988 (Sc3) may have a source connected to switch 980 (e.g. the drain of transistor 984 (Sc2)). The gate of transistor 988 (Sc3) may be connected to the gate controller circuit. A drain of transistor 988 (Sc3) may be connected to a second side of capacitor 994 (C1) and a first side of capacitor 995 (C2).

Switch 990 may comprise transistor 992 such as a MOSFET (e.g. an n-channel MOSFET). Transistor 992 (Sc4) may have a drain connected to switch 980 (e.g. the drain of transistor 984 (Sc2)). The gate of transistor 992 (Sc4) may be connected to the gate controller circuit. A source of transistor 992 (Sc4) may be connected to a second side of capacitor 995 (C2) and a first side of capacitor 996 (C3).

The source of transistor 982 (Sc1) may be connected to a cathode of diode 932 (Dc2). The anode of diode 932 (Dc2) may be connected to a second side of capacitor 996 (C3).

The first side of capacitor 994 (C1) is connected to an output, such as an output 106 (e.g., a positive output 106a) of the rectifier 100 and/or a first side of the load 998 (R). This forms a first voltage level (U). A second side of capacitor 994 (C1) is connected to a first side of capacitor 995 (C2), which forms a second voltage level (⅔ U). A second side of capacitor 995 (C2) is connected to a first side of capacitor 996 (C3), which forms a second voltage level (⅓ U). The second side of capacitor 996 (C3) is connected to an output, such as an output 106 (e.g., a negative output 106b) of the rectifier 100 and/or a second side of the load 998 (R), which forms a fourth voltage level (0).

FIG. 10 is a schematic view of a three phase four-level rectifier 100. A first phase 102a of the power source is shown as source 1010 ($u_a$), which provides power to a first side of inductor winding 1016 (La). A second side of inductor winding 1016 (La) is connected to a first side of switch 1040 and a first side of diode 1024 (Da2).

The inductor winding 1016 (La) may be connected to a first side of switch 1040. Switch 1040 may comprise a first transistor 1042 (Sa1) and a second transistor 1044 (Sa2). The first and second transistor 1042, 1044 may be MOSFET transistors (e.g. n-channel MOSFET or p-channel MOSFET), although other transistors such as IGBTs. The source of transistor 1042 (Sa1) may be connected to the second side of inductor winding 1016 (La). The gate of transistor 1042 (Sa1) may be connected to a gate controller circuit. The drain of transistor 1042 (Sa1) may be connected to an anode of diode 1022 (Da1). The cathode of diode 1022 (Da1) may be connected to a first side of capacitor 1094 (C1).

The drain of transistor 1042 (Sa1) may also be connected to the drain of transistor 1044 (Sa2). The gate of transistor 1044 (Sa2) may be connected to the gate controller circuit. The source of transistor 1044 (Sa2) may be connected to switch 1046 and switch 1050.

Switch 1046 may comprise transistor 1048 such as a MOSFET (e.g. an n-channel MOSFET or p-channel MOSFET), although other transistors such as IGBTs. Transistor 1048 (Sa3) may have a source connected to switch 1040 (e.g. the source of transistor 1044 (Sa2)). The gate of transistor 1048 (Sa3) may be connected to the gate controller circuit. A drain of transistor 1048 (Sa3) may be connected to a second side of capacitor 1094 (C1) and a first side of capacitor 1095 (C2).

Switch 1050 may comprise transistor 1052 such as a MOSFET (e.g. an n-channel MOSFET or p-channel MOSFET), although other transistors such as IGBTs. Transistor 1052 (Sa4) may have a drain connected to switch 1040 (e.g. the source of transistor 1044 (Sa2)). The gate of transistor 1052 (Sa4) may be connected to the gate controller circuit. A source of transistor 1052 (Sa4) may be connected to a second side of capacitor 1095 (C2) and a first side of capacitor 1096 (C3).

The inductor winding 1016 (La) may be connected to a cathode of diode 1024 (Da2). The anode of diode 1024 (Da2) may be connected to a second side of capacitor 1096 (C3).

A second phase 102b of the power source is shown as source 1012 ($ub$), which provides power to a first side of inductor winding 1018 (Lb). A second side of inductor winding 1018 (Lb) is connected to a first side of switch 1060 and a first side of diode 1028 (Db2).

The inductor winding 1018 (Lb) may be connected to a first side of switch 1060. Switch 1060 may comprise a first transistor 1062 (Sb1) and a second transistor 1064 (Sb2). The first and second transistor 1062, 1064 may be MOSFET transistors (e.g. n-channel MOSFET). The source of transistor 1062 (Sb1) may be connected to the second side of inductor winding 1018 (Lb). The gate of transistor 1062 (Sb1) may be connected to the gate controller circuit. The drain of transistor 1062 (Sb1) may be connected to an anode of diode 1026 (Db1). The cathode of diode 1026 (Db1) may be connected to a first side of capacitor 1094 (C1).

The drain of transistor 1062 (Sb1) may also be connected to the drain of transistor 1064 (Sb2). The gate of transistor 1064 (Sb2) may be connected to the gate controller circuit. The source of transistor 1064 (Sb2) may be connected to switch 1066 and switch 1070.

Switch 1066 may comprise transistor 1068 such as a MOSFET (e.g. an n-channel MOSFET). Transistor 1068 (Sb3) may have a source connected to switch 1060 (e.g. the source of transistor 1064 (Sb2)). The gate of transistor 1068 (Sb3) may be connected to the gate controller circuit. A drain of transistor 1068 (Sb3) may be connected to a second side of capacitor 1094 (C1) and a first side of capacitor 1095 (C2).

Switch 1070 may comprise transistor 1072 such as a MOSFET (e.g. an n-channel MOSFET). Transistor 1072 (Sb4) may have a drain connected to switch 1060 (e.g. the source of transistor 1064 (Sb2)). The gate of transistor 1072 (Sb4) may be connected to the gate controller circuit. A source of transistor 1072 (Sb4) may be connected to a second side of capacitor 1095 (C2) and a first side of capacitor 1096 (C3).

The inductor winding 1018 (Lb) may be connected to a cathode of diode 1028 (Db2). The anode of diode 1028 (Db2) may be connected to a second side of capacitor 1096 (C3).

A third phase 102c of the power source is shown as source 1014 ($u_c$), which provides power to a first side of inductor winding 1020 (Lc). A second side of inductor winding 1020 (Lc) is connected to a first side of switch 1080 and a first side of diode 1032 (Dc2).

The inductor winding 1020 (Lc) may be connected to a first side of switch 1080. Switch 1080 may comprise a first transistor 1082 (Sc1) and a second transistor 1084 (Sc2). The first and second transistor 1082, 1084 may be MOSFET transistors (e.g. n-channel MOSFET). The source of transistor 1082 (Sc1) may be connected to the second side of inductor winding 1020 (Lc). The gate of transistor 1082 (Sc1) may be connected to a gate controller circuit. The drain of transistor 1082 (Sc1) may be connected to an anode of diode 1030 (Dc1). The cathode of diode 1030 (Dc1) may be connected to a first side of capacitor 1094 (C1).

The drain of transistor 1082 (Sc1) may also be connected to the drain of transistor 1084 (Sc2). The gate of transistor 1084 (Sc2) may be connected to the gate controller circuit. The source of transistor 1084 (Sc2) may be connected to switch 1086 and switch 1090.

Switch 1086 may comprise transistor 1088 such as a MOSFET (e.g. an n-channel MOSFET). Transistor 1088 (Sc3) may have a source connected to switch 1080 (e.g. the source of transistor 1084 (Sc2)). The gate of transistor 1088 (Sc3) may be connected to the gate controller circuit. A drain of transistor 1088 (Sc3) may be connected to a second side of capacitor 1094 (C1) and a first side of capacitor 1095 (C2).

Switch 1090 may comprise transistor 1092 such as a MOSFET (e.g. an n-channel MOSFET). Transistor 1092 (Sc4) may have a drain connected to switch 1080 (e.g. the source of transistor 1084 (Sc2)). The gate of transistor 1092 (Sc4) may be connected to the gate controller circuit. A source of transistor 1092 (Sc4) may be connected to a second side of capacitor 1095 (C2) and a first side of capacitor 1096 (C3).

The inductor winding 1020 (Lc) may be connected to a cathode of diode 1032 (Dc2). The anode of diode 1032 (Dc2) may be connected to a second side of capacitor 1096 (C3).

The first side of capacitor 1094 (C1) is connected to an output, such as an output 106 (e.g., a positive output 106a) of the rectifier 100 and/or a first side of the load 1098 (R). This forms a first voltage level (U). A second side of capacitor 1094 (C1) is connected to a first side of capacitor 1095 (C2), which forms a second voltage level ($\frac{2}{3}$ U). A second side of capacitor 1095 (C2) is connected to a first side of capacitor 1096 (C3), which forms a second voltage level (⅓ U). The second side of capacitor 1096 (C3) is connected to an output, such as an output 106 (e.g., a negative output 106*b*) of the rectifier 100 and/or a second side of the load 1098 (R), which forms a fourth voltage level (0).

Figure 12:
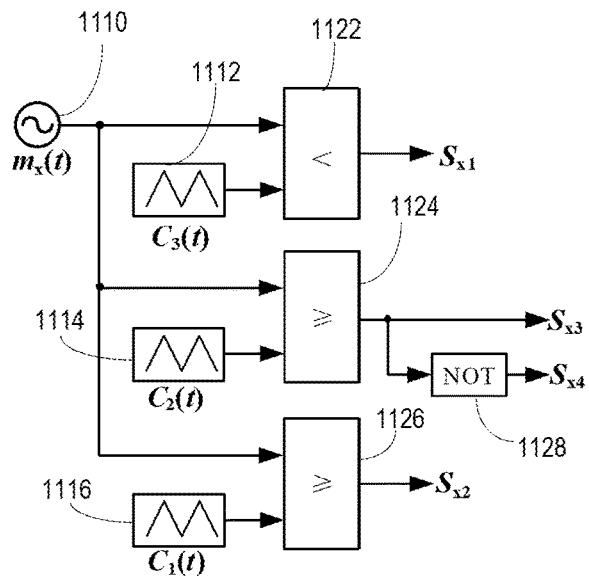
FIG. 12 illustrates one implementation of the gate control logic for driving the circuit of FIG. 9.

FIG. 12 illustrates one implementation of the gate control logic for driving the circuit of FIG. 9. The voltage source 1110 provides an input function of Mx(t). The gate control uses three triangle control waves (C1(*t*), C2(*t*), C3(*t*)) that are offset from one another. An output from the voltage source 1110 (Mx(t)) is compared with output of a first control generator 1112 (C3(*t*)). When Mx(t) is less than to C3(*t*) in logic block 1122, the gate of Sx1 is activated. When Mx(t) is not less than to C3(*t*) in logic block 1122, the gate of Sx1 is deactivated.

An output from the voltage source 1110 (Mx(t)) is compared with output of a second control generator 1114 (C2(*t*)). When Mx(t) is greater than or equal to C2(*t*) in logic block 1124, the gate of Sx3 is activated and the gate of Sx4 is deactivated. When Mx(t) is not greater than or equal to C2(*t*) in logic block 1124, the gate of Sx3 is deactivated and the gate of Sx4 is activated.

An output from the voltage source 1110 (Mx(t)) is compared with output of a third control generator 1116 (C1(*t*)). When Mx(t) is greater than or equal to C1(*t*) in logic block 1126, the gate of Sx2 is activated. When Mx(t) is not greater than or equal to C1(*t*) in logic block 1126, the gate of Sx2 is deactivated.

Figure 13:
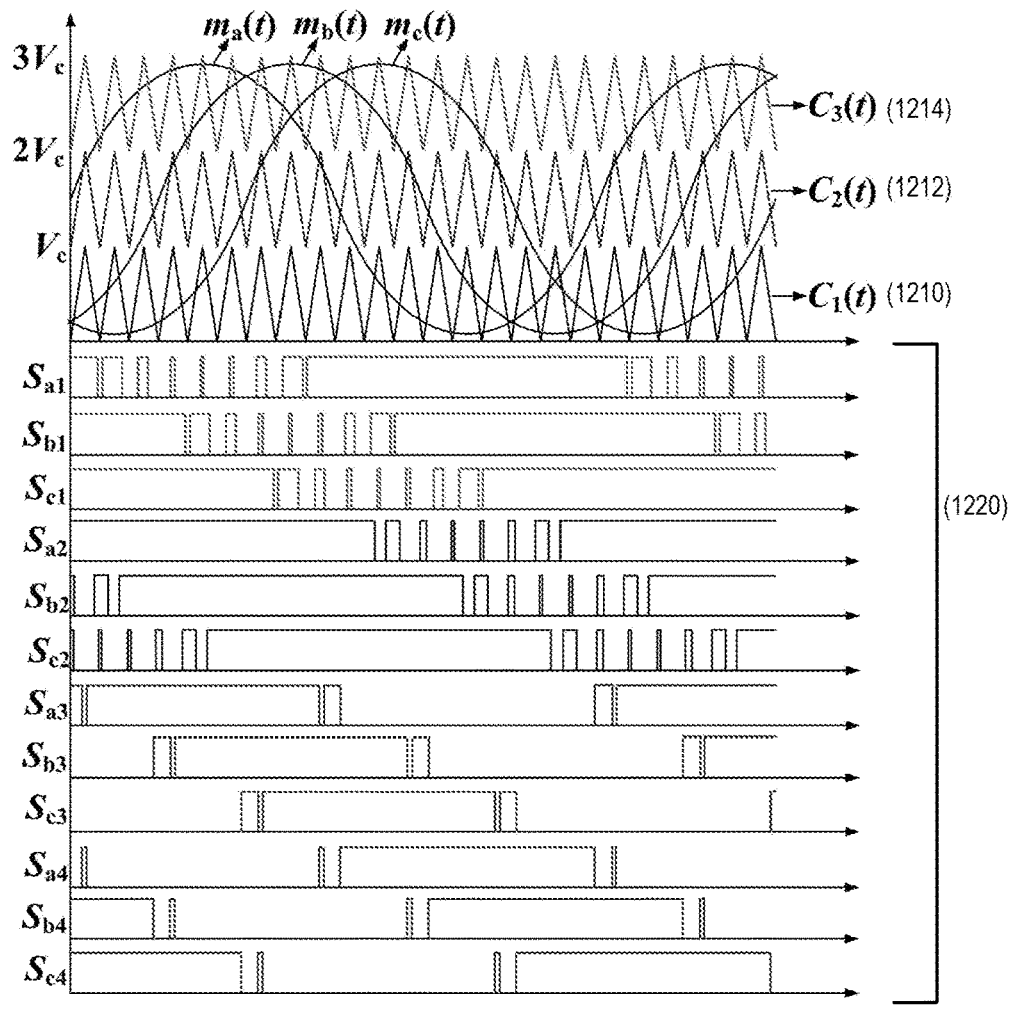
FIG. 13 is a chart illustrating the timing of control signals for the rectifier of FIG. 9.

FIG. 13 is a chart illustrating the timing of control signals for the rectifier of FIG. 9. The chart includes the first control signal 1210 C1(*t*), the second control signal 1212 C2(*t*), the third control signal 1214 C3(*t*), and the output of the gate control logic for each transistor as provided in timing diagram 1220. The first control signal 1210 C1(*t*), the second control signal 1212 C2(*t*), the third control signal 1214 C3(*t*) are provided to the logic as described in FIG. 12 to produce the gate timing shown at 1220.

This application also proposes a three-phase hybrid four-level rectifier, which comprises of a three-level half-bridge circuit and a two-level half-bridge circuit. Compared with the conventional four-level neutral point clamped (NPC) rectifier, two switches are reduced in each phase leg. This means six power switches are reduced in total. Four output levels are achieved with small component stress in the proposed four-level rectifier, which could be an alternative to serve as the fronted rectifier for fast chargers, medium-voltage drives, wind power conversion systems, plasma power supplies, and induction heating power supplies.

Multilevel converters have caught increasing attention as these converters provide multiple output voltage levels. As the output voltage levels increase, a high quality output voltage can be achieved, including a good total harmonic distortion (THD) with low dv/dt, higher voltage handling capability, mitigated electromagnetic interference (EMI) and a small size of output filter, etc. All of these merits make multilevel converters widely used in medium voltage (3 kV-33 kV) and high power applications. Due to the continuously growing industrial demand, multilevel converters are also currently considered for low voltage applications (e.g. 200V-480V) as an alternative to the conventional two-level converter. Compared with a two-level converter, to achieve equivalent output harmonics, the switching frequency of multilevel converters can be kept low, thus reducing the switching losses and shrinking the heat sink size. If operated at the same switching frequency, the filter size of multilevel converters can be smaller. This means that multilevel converters provide lower switching loss and a smaller filter requirement due to the use of lower voltage-rating devices and lower switching voltage, which helps lead to a higher power density. In addition, it also provides a possibility to further increase the switching frequency and achieve a higher power density system. Power density is an important factor in electric aircrafts, electric/hybrid vehicles, electric drive ships, and even solar or wind power generation systems.

In aircraft generation systems, variable speed wind power generation systems, and back-to-back electric drive systems, there is no regenerative power requirement. A three-phase four-level rectifier topology with reduced power switches and diodes may be desired to achieve high power density, low switching loss, and small filters. Among the existing multilevel converters for direct AC/DC conversion, the diode neutral point clamped (NPC) rectifiers, especially the three-level NPC rectifier is widely used for medium voltage drives. Although a higher number of voltage levels can be achieved and the output voltage quality can be further improved by using four-level converters, one of the main concerns is the increasing number of devices used. For example, the four-level NPC rectifier needs 18 active switches and 12 power diodes, which greatly increases control complexity and degrades the system reliability due to the increased possibility of device failure.

Figure 14:
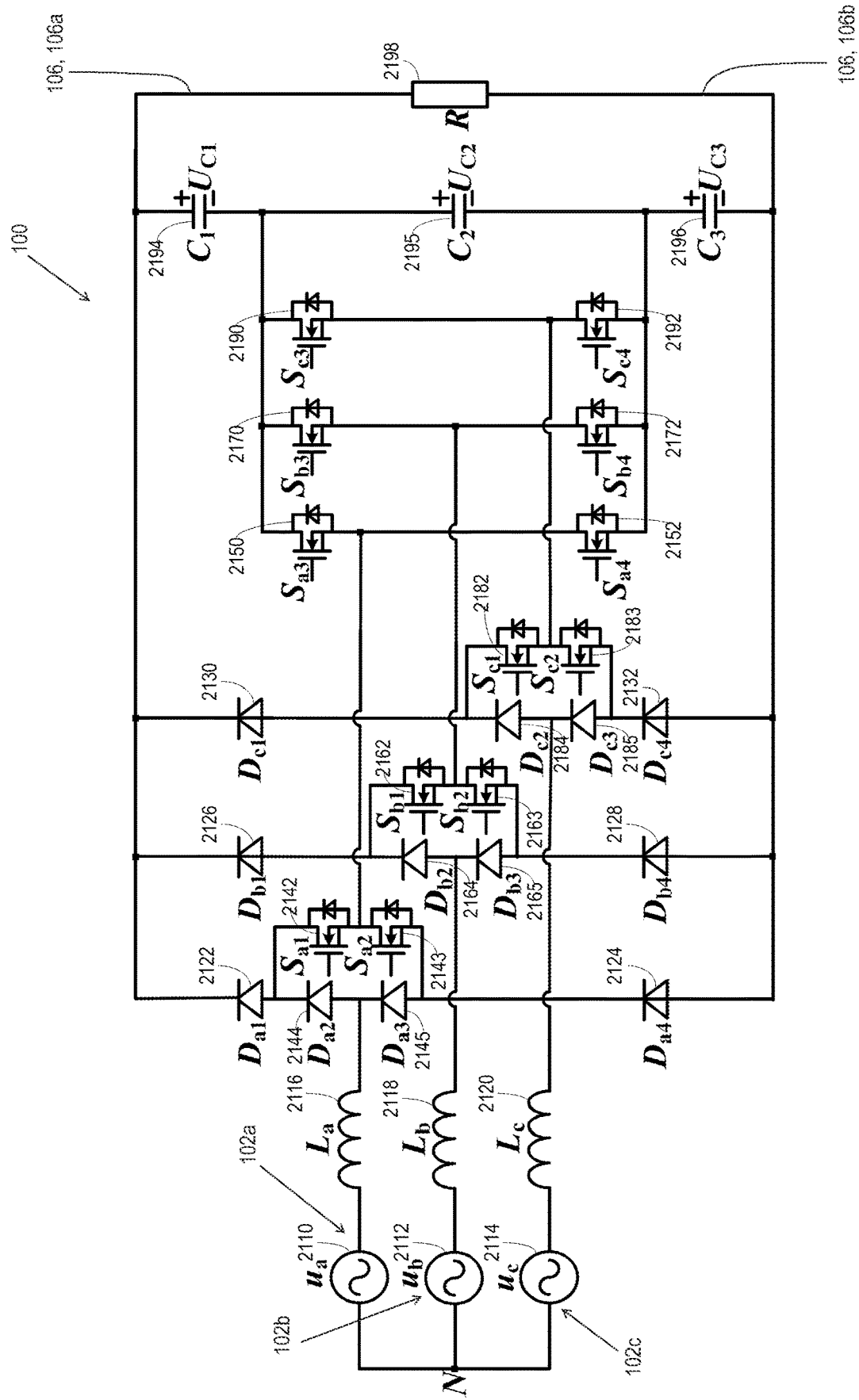
FIG. 14 is a schematic view of a three phase four-level rectifier.

FIG. 14 is a schematic view of a three phase four-level rectifier 100. A first phase 102*a* of the power source is shown as source 110 ($u_a$), which provides power to a first side of inductor winding 2116 (La). A second side of inductor winding 2116 (La) is connected to a first side of diode 2144 (Da2) and a first side of diode 2145 (Da3). The inductor winding 2116 (La) may be connected to an anode of diode 2144 (Da2). The cathode of diode 2144 (Da2) may be connected to an anode of diode 2122 (Da1) and a first switch (e.g. a drain of transistor 2142 (Sa1)). The cathode of diode 2122 (Da1) may be connected to a first side of capacitor 2194 (C1).

The inductor winding 2116 (La) may be connected to the first switch (transistor 2142 (Sa1)) through diode 2144 (Da2) and a second switch (e.g. transistor 2143 (Sa2)) through diode 2145 (Da3). Transistor 2142 (Sa1) and transistor 2143 (Sa2) may be MOSFET transistors (e.g. n-channel MOSFET, although p-channel MOSFETs or IGBTs may be used). The inductor winding 2116 (La) may be connected a cathode of diode 2145 (Da3). The anode of diode 2145 (Da3) may be connected to the source of transistor 2143 (Sa2) and the cathode of diode 2124 (Da4). The source of transistor 2142 (Sa1) may be connected to drain of transistor 2143 (Sa2). The gate of transistor 2142 (Sa1) and the gate of transistor 2143 (Sa2) may be connected to a gate controller circuit. Further, the source of transistor 2142 (Sa1) and the drain of transistor 2143 (Sa2) may be connected to the transistor 2150 (Sa3) and transistor 2152 (Sa4).

A third switch may comprise transistor 2150 such as a MOSFET (e.g. an n-channel MOSFET, although p-channel MOSFETs or IGBTs may be used). Transistor 2150 (Sa3) may have a source connected to the first switch and second switch (e.g. the source of transistor 2142 (Sa1) and the drain of transistor 2143 (Sa2)). The gate of transistor 2150 (Sa3) may be connected to the gate controller circuit. A drain of transistor 2150 (Sa3) may be connected to a second side of capacitor 2194 (C1) and a first side of capacitor 2195 (C2).

A fourth switch may comprise transistor 2152 such as a MOSFET (e.g. an n-channel MOSFET, although p-channel MOSFETs or IGBTs may be used). Transistor 2152 (Sa4)

may have a drain connected to the first switch and second switch (e.g. the source of transistor 2142 (Sa1) and the drain of transistor 2143 (Sa2)). The gate of transistor 2152 (Sa4) may be connected to the gate controller circuit. A source of transistor 2152 (Sa4) may be connected to a second side of capacitor 2195 (C2) and a first side of capacitor 2196 (C3).

The inductor winding 2116 (La) may be connected to a cathode of diode 2124 (Da4) through diode 2145 (Da3). The anode of diode 2124 (Da4) may be connected to a second side of capacitor 2196 (C3).

A second phase 102*b* of the power source is shown as source 2112 (*ub*), which provides power to a first side of inductor winding 2118 (Lb). A second side of inductor winding 2118 (Lb) is connected to a first side of diode 2164 (Db2) and a first side of diode 2165 (Db3). The inductor winding 2118 (Lb) may be connected to an anode of diode 2164 (Db2). The cathode of diode 2164 (Db2) may be connected to an anode of diode 2126 (Db1) and a first switch (e.g. a drain of transistor 2162 (Sb1)). The cathode of diode 2126 (Db1) may be connected to a first side of capacitor 2194 (C1).

The inductor winding 2118 (Lb) may be connected to the first switch (transistor 2162 (Sb1)) through diode 2164 (Db2) and a second switch (e.g. transistor 2163 (Sb2)) through diode 2165 (Db3). Transistor 2162 (Sb1) and transistor 2163 (Sb2) may be MOSFET transistors (e.g. n-channel MOSFET, although p-channel MOSFETs or IGBTs may be used). The inductor winding 2118 (Lb) may be connected a cathode of diode 2165 (Db3). The anode of diode 2165 (Db3) may be connected to the source of transistor 2163 (Sb2) and the cathode of diode 2128 (Db4). The source of transistor 2162 (Sb1) may be connected to drain of transistor 2163 (Sb2). The gate of transistor 2162 (Sb1) and the gate of transistor 2163 (Sb2) may be connected to a gate controller circuit. Further, the source of transistor 2162 (Sb1) and the drain of transistor 2163 (Sb2) may be connected to the transistor 2170 (Sb3) and transistor 2172 (Sb4).

A third switch may comprise transistor 2170 such as a MOSFET (e.g. an n-channel MOSFET, although p-channel MOSFETs or IGBTs may be used). Transistor 2170 (Sb3) may have a source connected to the first switch and second switch (e.g. the source of transistor 2162 (Sb1) and the drain of transistor 2163 (Sb2)). The gate of transistor 2170 (Sb3) may be connected to the gate controller circuit. A drain of transistor 2170 (Sb3) may be connected to a second side of capacitor 2194 (C1) and a first side of capacitor 2195 (C2).

A fourth switch may comprise transistor 2172 such as a MOSFET (e.g. an n-channel MOSFET, although p-channel MOSFETs or IGBTs may be used). Transistor 2172 (Sb4) may have a drain connected to the first switch and second switch (e.g. the source of transistor 2162 (Sb1) and the drain of transistor 2163 (Sb2)). The gate of transistor 2172 (Sb4) may be connected to the gate controller circuit. A source of transistor 2172 (Sb4) may be connected to a second side of capacitor 2195 (C2) and a first side of capacitor 2196 (C3).

The inductor winding 2118 (Lb) may be connected to a cathode of diode 2128 (Db4) through diode 2165 (Db3). The anode of diode 2128 (Db4) may be connected to a second side of capacitor 2196 (C3).

A third phase 102*c* of the power source is shown as source 2114 ($u_c$), which provides power to a first side of inductor winding 2120 (Lc). A second side of inductor winding 2120 (Lc) is connected to a first side of diode 2184 (Dc2) and a first side of diode 2185 (Dc3). The inductor winding 2120 (Lc) may be connected to an anode of diode 2184 (Dc2). The cathode of diode 2184 (Dc2) may be connected to an anode of diode 2130 (Dc1) and a first switch (e.g. a drain of transistor 2182 (Sc1)). The cathode of diode 2130 (Dc1) may be connected to a first side of capacitor 2194 (C1).

The inductor winding 2120 (Lc) may be connected to the first switch (transistor 2182 (Sc1)) through diode 2184 (Dc2) and a second switch (e.g. transistor 2183 (Sc2)) through diode 2185 (Dc3). Transistor 2182 (Sc1) and transistor 2183 (Sc2) may be MOSFET transistors (e.g. n-channel MOSFET, although p-channel MOSFETs or IGBTs may be used). The inductor winding 2120 (Lc) may be connected a cathode of diode 2185 (Dc3). The anode of diode 2185 (Dc3) may be connected to the source of transistor 2183 (Sc2) and the cathode of diode 2132 (Dc4). The source of transistor 2182 (Sa1) may be connected to drain of transistor 2183 (Sc2). The gate of transistor 2182 (Sc1) and the gate of transistor 2183 (Sc2) may be connected to a gate controller circuit. Further, the source of transistor 2182 (Sc1) and the drain of transistor 2183 (Sc2) may be connected to the transistor 2190 (Sc3) and transistor 2192 (Sc4).

A third switch may comprise transistor 2190 such as a MOSFET (e.g. an n-channel MOSFET, although p-channel MOSFETs or IGBTs may be used). Transistor 2190 (Sc3) may have a source connected to the first switch and second switch (e.g. the source of transistor 2182 (Sc1) and the drain of transistor 2183 (Sc2)). The gate of transistor 2190 (Sc3) may be connected to the gate controller circuit. A drain of transistor 2190 (Sc3) may be connected to a second side of capacitor 2194 (C1) and a first side of capacitor 2195 (C2).

A fourth switch may comprise transistor 2192 such as a MOSFET (e.g. an n-channel MOSFET, although p-channel MOSFETs or IGBTs may be used). Transistor 2192 (Sc4) may have a drain connected to the first switch and second switch (e.g. the source of transistor 2182 (Sc1) and the drain of transistor 2183 (Sc2)). The gate of transistor 2192 (Sc4) may be connected to the gate controller circuit. A source of transistor 2192 (Sc4) may be connected to a second side of capacitor 2195 (C2) and a first side of capacitor 2196 (C3).

The inductor winding 2120 (Lc) may be connected to a cathode of diode 2132 (Dc4) through diode 2185 (Dc3). The anode of diode 2132 (Dc4) may be connected to a second side of capacitor 2196 (C3).

The first side of capacitor 2194 (C1) is connected to an output, such as an output 106 (e.g., a positive output 106*a*) of the rectifier 100 and/or a first side of the load 2198 (R). This forms a first voltage level (U). A second side of capacitor 2194 (C1) is connected to a first side of capacitor 2195 (C2), which forms a second voltage level (⅔ U). A second side of capacitor 2195 (C2) is connected to a first side of capacitor 2196 (C3), which forms a second voltage level (⅓ U). The second side of capacitor 2196 (C3) is connected to an output, such as an output 106 (e.g., a negative output 106*b*) of the rectifier 100 and/or the second side of the load 2198 (R), which forms a fourth voltage level (0).

FIG. 14 provides one implementation of the proposed three-phase four-level rectifier, which is developed by combining a three-level half-bridge (Dx1, Dx2, Dx3, Dx4, Sx1, Sx2) circuit and a two-level half-bridge (Sx3, Sx4) circuit. In FIG. 14, UC1, UC2, UC3 represent the capacitor voltages of C1, C2, C3; Udc represents the output dc link voltage; and ua, ub, uc represent the input three phase voltages. Besides, the three separate capacitors are required to have the same capacitance.

$$C_1 = C_2 = C_3 \qquad (5)$$

In the proposed four-level rectifier, the voltage stresses across the power diodes $D_{x1}$ and $D_{x4}$ are given as below $$u_{Dx1} = u_{Dx4} = \tfrac{2}{3} U_{dc} (x=a,b,c) \qquad (6)$$

The voltage stresses across all the switches and other diodes are also given as follows $$u_{Sx1} = u_{Sx2} = u_{Sx3} = u_{Sx4} = u_{Dx2} = u_{Dx3} = \frac{U_{dc}}{3} \quad (x = a, b, c)$$ (7)

It can be concluded from (6) and (7) that the voltage stresses across all switches and diodes are small. It means the proposed four-level rectifier is suitable for medium voltage and high power applications.

Figure 15:
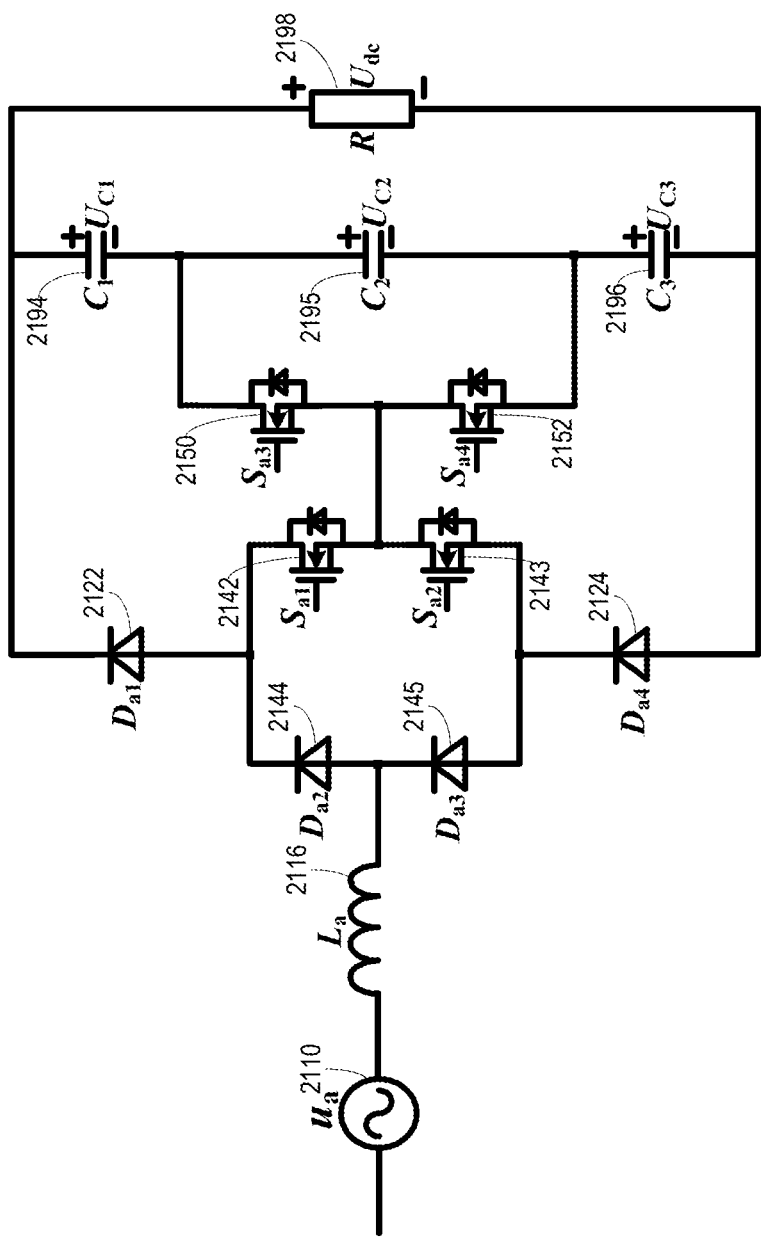
FIG. 15 is a schematic view of one implementation of one phase of the four-level rectifier described in FIG. 14.

FIG. 15 is a schematic view of one implementation of one phase of the three phase four-level rectifier described in FIG. 14. As such, the elements in FIG. 15 may be duplicated 3 times, one for each phase, in the full 3-phase system.

Figure 16A:
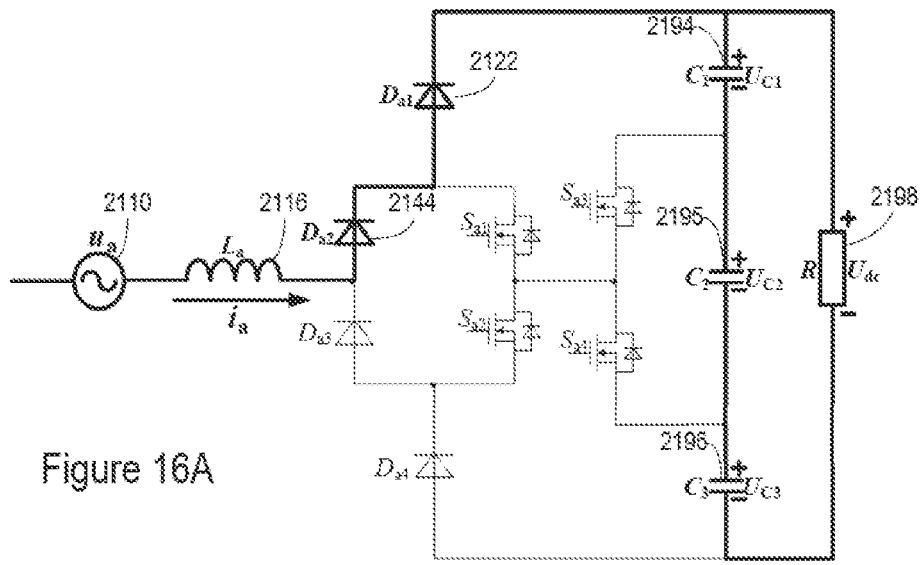
FIGS. 16A through 16F illustrate the current path for the rectifier at each voltage level.
Figure 16B:
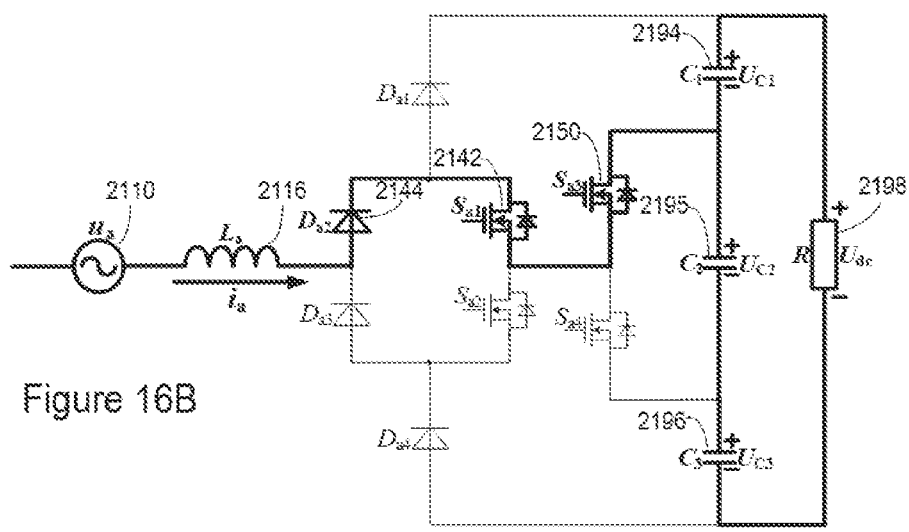
Figure 16C:
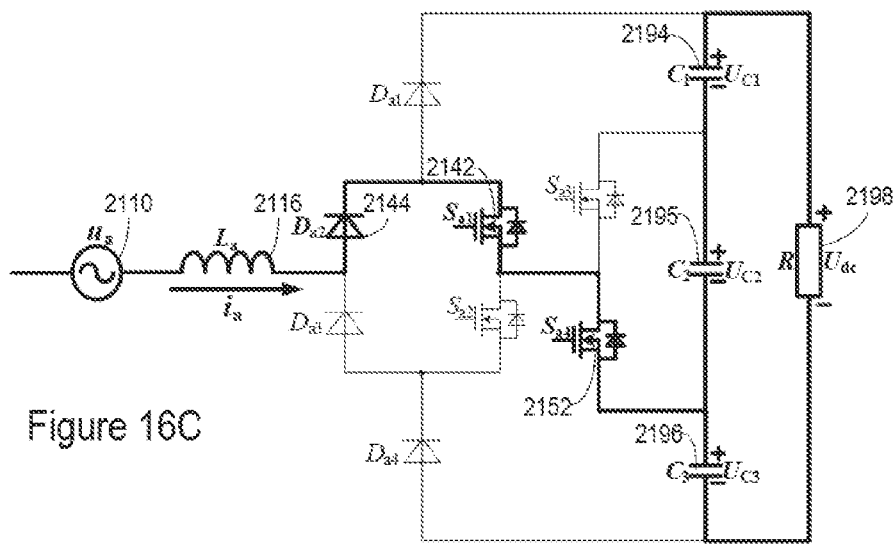

Table III summarizes the switching states in different voltage levels. Besides, taking phase A as an example, the conduction paths of switches in phase A and corresponding output voltage levels are presented in FIGS. 16A-16F. FIGS. 16A-16C illustrate the output voltage levels $U_{dc}$, $\frac{2}{3}U_{dc}$ and $\frac{1}{3}U_{dc}$ with the current flowing from the input terminal to the output terminal, while FIGS. 16D-16F illustrate the voltage levels 0, $\frac{2}{3}U_{dc}$ and $\frac{1}{3}U_{dc}$ with the current flowing from the output terminal to the input terminal.

TABLE III

Switching states

Figure 16D:
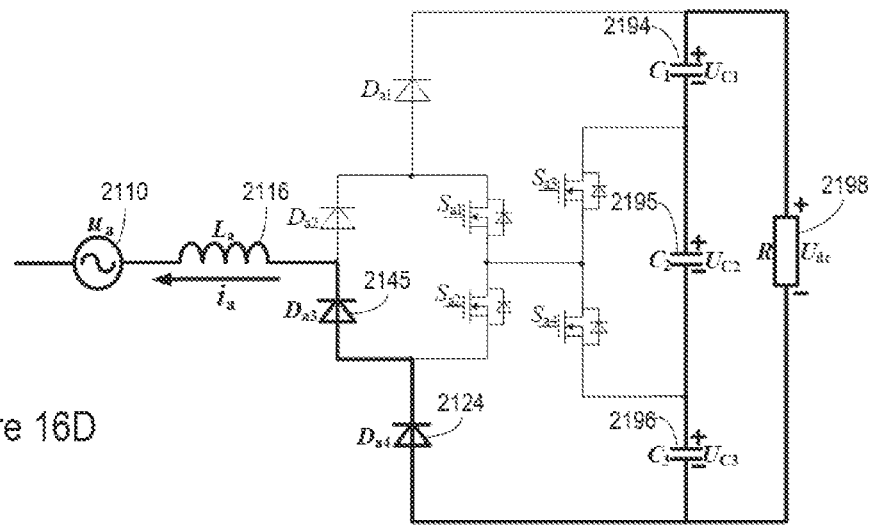
Figure 16E:
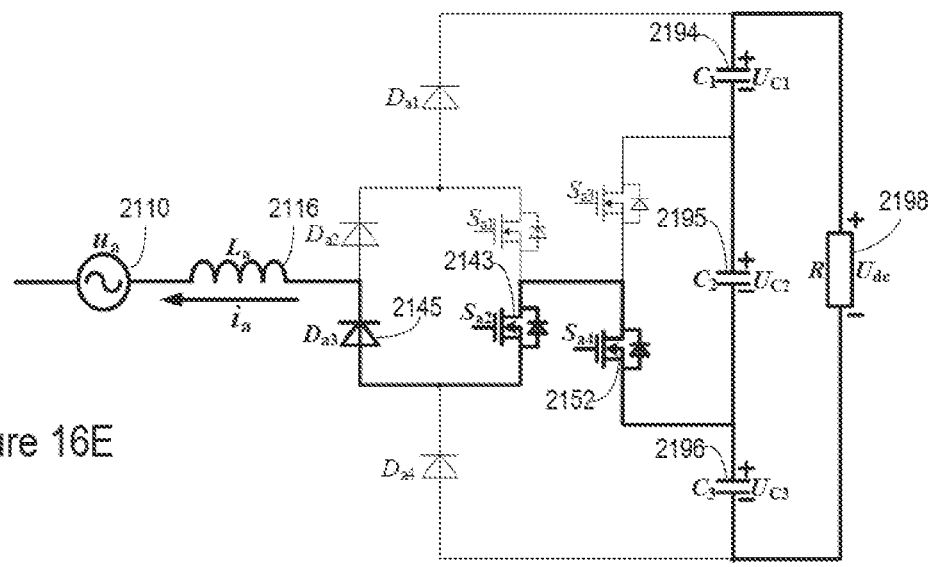
Figure 16F:
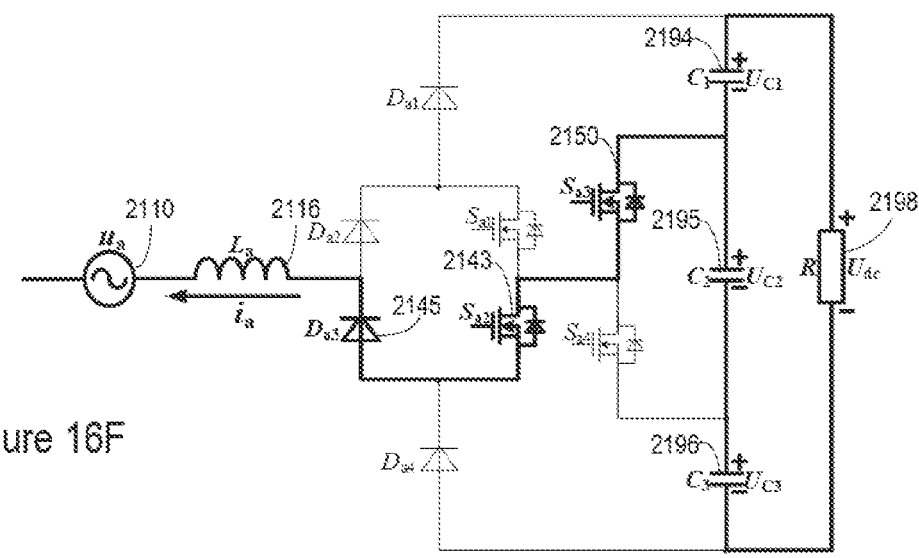

| Voltage Level | State | $S_{a1}$ | $S_{a2}$ | $S_{a3}$ | $S_{a4}$ | $D_{a1}$ | $D_{a2}$ | $D_{a3}$ | $D_{a4}$ |
|---|---|---|---|---|---|---|---|---|---|
| $U_{dc}$ | FIG. 16A | 0 | 0 | 0 | 0 | 1 | 1 | 0 | 0 |
| $2/3U_{dc}$ | FIG. 16B | 1 | 0 | 1 | 0 | 0 | 1 | 0 | 0 |
| $1/3U_{dc}$ | FIG. 16C | 1 | 0 | 0 | 1 | 0 | 1 | 0 | 0 |
| 0 | FIG. 16D | 0 | 0 | 0 | 0 | 0 | 0 | 1 | 1 |
| $1/3U_{dc}$ | FIG. 16E | 0 | 1 | 0 | 1 | 0 | 0 | 1 | 0 |
| $2/3U_{dc}$ | FIG. 16F | 0 | 1 | 1 | 0 | 0 | 0 | 1 | 0 |

FIG. 16A illustrates the current path for the rectifier at the first level (U). The current flows from the inductor winding 2116 (La) through diode 2144 (Da2) and diode 2122 (Da1) to the first side of the capacitor 2194 (C1), then to the load 2198 (R).

FIG. 16B illustrates the current path for the rectifier at the second level (⅔U). The current flows from the inductor winding 2116 (La) through diode 2144 (Da2) to transistor 2142 (Sa1), then from transistor 2142 (Sa1) to transistor 2150 (Sa3), and from transistor 2150 (Sa3) to the second side of capacitor 2194 (C1) and the first side of capacitor 2195 (C2), then to the load 2198 (R).

FIG. 16C illustrates the current path for the rectifier at the third level (⅓ U). The current flows from the inductor winding 2116 (La) through diode 2144 (Da2) to transistor 2142 (Sa1). The current then flows through transistor 2142 (Sa1) to transistor 2152 (Sa4), then from transistor 2152 (Sa4) to the second side of the capacitor 2195 (C2) and the first side of capacitor 2196 (C3), then to the load 2198 (R).

FIG. 16D illustrates the current path for the rectifier at the fourth level (0). The current flows from the inductor winding 2116 (La) through the diode 2145 (Da3) and diode 2124 (Da4) to the second side of the capacitor 2196 (C3), then to the load 2198 (R).

FIG. 16E illustrates the current path for the rectifier at the third level (⅓ U). The current flows from the inductor winding 2116 (La) through diode 2145 (Da3) to transistor 2143 (Sa2). The current then flows through transistor 2143 (Sa2) to transistor 2152 (Sa4), then from transistor 2152 (Sa4) to the second side of the capacitor 2195 (C2) and the first side of capacitor 2196 (C3), then to the load 2198 (R).

FIG. 16F illustrates the current path for the rectifier at the second level (⅔ U). The current flows from the inductor winding 2116 (La) through diode 2145 (Da3) to transistor 2143 (Sa2), then from transistor 2143 (Sa2) to transistor 2150 (Sa3), and from transistor 2150 (Sa3) to the second side of capacitor 2194 (C1) and the first side of capacitor 2195 (C2), then to the load 2198 (R).

For the proposed four-level rectifier, a carrier-based modulation scheme is used. The three reference signals $m_a(t)$, $m_b(t)$ and $m_c(t)$ shown in (8) are compared with three triangular carrier signals $C_1(t)$, $C_2(t)$ and $C_3(t)$ to produce drive signals for all switches. $C_1(t)$, $C_2(t)$ and $C_3(t)$ have the same carrier frequency fs and amplitude Vc and they are in phase with an offset value that is equivalent to Vc.

$$\begin{cases} m_a(t) = V_m \sin(2\pi f_m t) + \frac{3V_c}{2} \\ m_b(t) = V_m \sin\left(2\pi f_m t - \frac{2\pi}{3}\right) + \frac{3V_c}{2} \\ m_c(t) = V_m \sin\left(2\pi f_m t + \frac{2\pi}{3}\right) + \frac{3V_c}{2} \end{cases}$$ (8)

In (8), $V_m$ means the peak amplitude of the reference signal and $f_m$ means the fundamental frequency. Thus, the modulation index m for this rectifier can be defined by $$m = \frac{2V_m}{3V_c}$$ (9)

Figure 17:
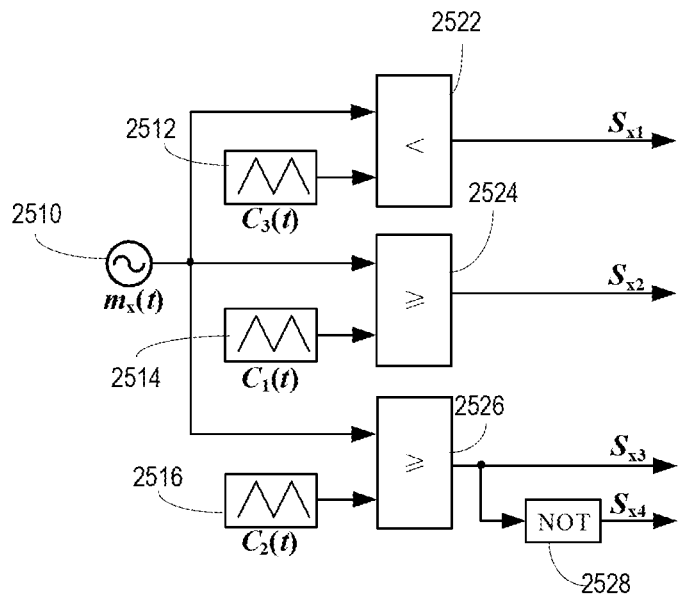
FIG. 17 illustrates one implementation of the gate control logic for driving the circuit of FIG. 14.

FIG. 17 illustrates one implementation of the gate control logic for driving the circuit of FIG. 14. The voltage source 2510 provides an input function of Mx(t). The gate control uses three triangle control waves (C1(t), C2(t), C3(t)) that are offset from one another. An output from the voltage source 2510 (Mx(t)) is compared with output of a first control generator 2512 (C3(t)). When Mx(t) is less than or C3(t) in logic block 2522, the gate of Sx1 is activated. When Mx(t) is not less than C3(t) in logic block 2522, the gate of Sx1 is deactivated.

An output from the voltage source 2510 (Mx(t)) is compared with output of a third control generator 2514 (C1(t)). When Mx(t) is greater than or equal to C1(t) in logic block 2524, the gate of Sx2 is activated. When Mx(t) is not greater than or equal to C1(t) in logic block 2524, the gate of Sx2 is deactivated.

An output from the voltage source 2510 (Mx(t)) is compared with output of a second control generator 2516 (C2(t)). When Mx(t) is greater than or equal to C2(t) in logic block 2526, the gate of Sx3 is activated and the gate of Sx4 is deactivated. When Mx(t) is not greater than or equal to C2(t) in logic block 2526, the gate of Sx3 is deactivated and the gate of Sx4 is activated.

Figure 18:
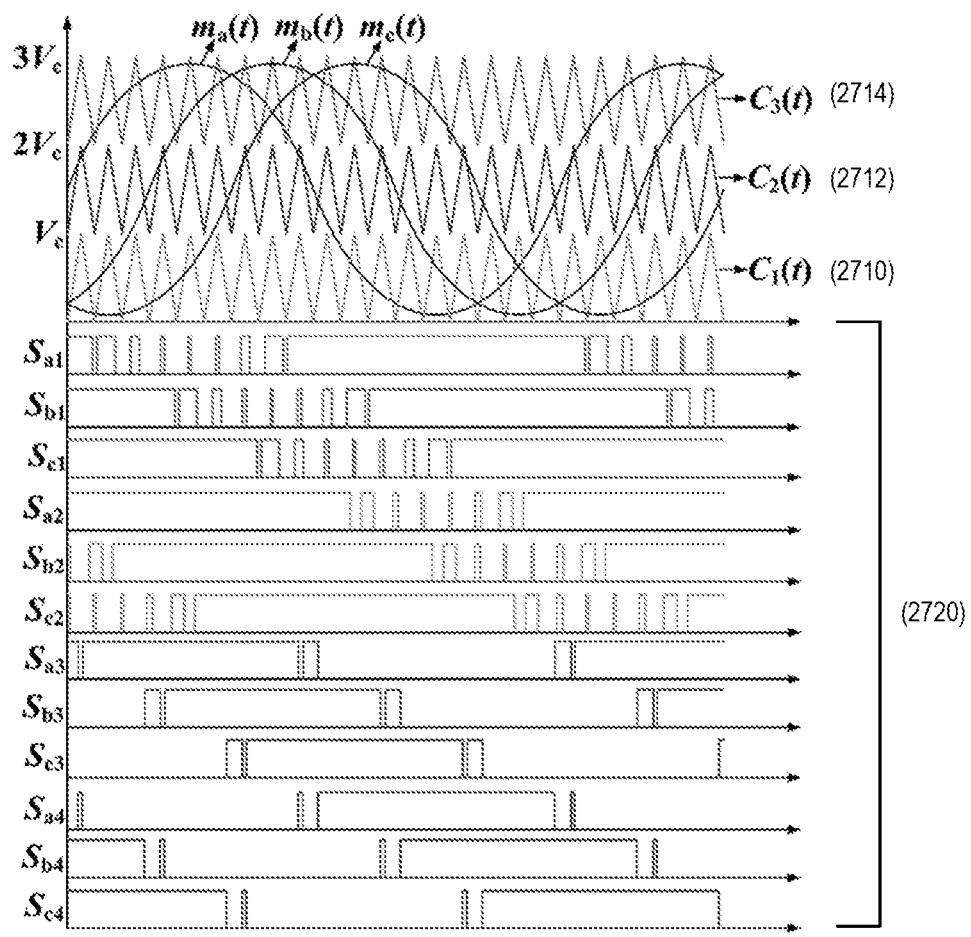
FIG. 18 is a chart illustrating the timing of control signals for the rectifier of FIG. 1.

FIG. 18 illustrates the control first control signal 2710 C1(t), the second control signal 2712 C2(t), the third control signal 2714 C3(t), and the output of the gate control logic for each transistor as provided in timing diagram 2720.

Like the existing four-level rectifiers, a very challenging issue is the voltage-balance control for the three DC-link capacitor voltages. A voltage balance circuit may be used to realize voltage balance for the proposed hybrid rectifier. A first buck/boost converter comprising of $L_1$, $S_1$ and $S_2$ is utilized to balance the capacitor voltages of $C_1$ and $C_2$, and the other buck/boost converter comprising of $L_2$, $S_3$ and $S_4$ may be utilized to balance the capacitor voltages of $C_2$ and $C_3$. The switches $S_1$ and $S_2$ are complementary to each other and the switches $S_3$ and $S_4$ are complementary to each other as well. Besides, the switches $S_1$ and $S_3$ are complementary to each other.

Figure 19:
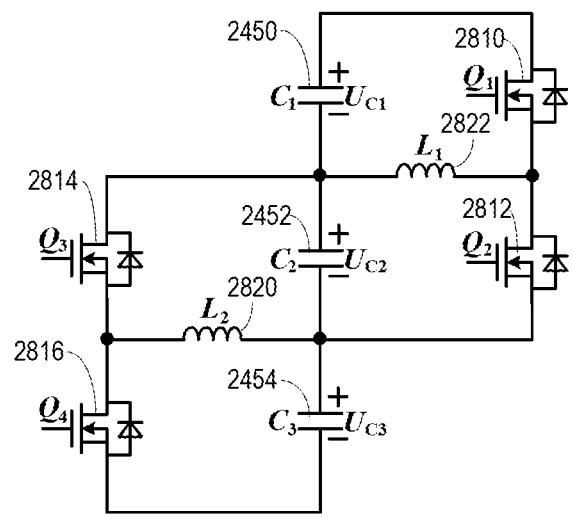
FIG. 19 is a schematic view of a balancing circuit.

FIG. 19 is a schematic view of a balancing circuit. A drain of transistor 810 (Q1) is connected to the first side of capacitor 2194. A source of transistor 2810 (Q1) is connected to the second side of capacitor 2194 (C1) and a first side of capacitor 2195 (C2) through inductor 2822 (L1). The drain of transistor 2812 (Q2) is connected to the second side of capacitor 2194 (C1) and a first side of capacitor 2195 (C2) through inductor 2822 (L1). The source of transistor 2812 (Q2) is connected to the second side of capacitor 2195 (C2) and the first side of capacitor 2196 (C3). A drain of transistor 2814 (Q3) is connected to a second side of capacitor 2194 (C1) and a first side of capacitor 2195 (C2). A source of transistor 2814 (Q3) is connected to a second side for capacitor 2195 (C2) and a first side of capacitor 2196 (C3) through inductor 2820 (L2). The drain of transistor 2816 (Q4) is connected to the second side for capacitor 2195 (C2) and a first side of capacitor 2196 (C3) through inductor 2820 (L2). The source of transistor 2816 (Q4) is connected to the second side of capacitor 2196 (C3). The gates of transistors 2810 (Q1), 2812 (Q2), 2814 (Q3), and 2816 (Q4) may be connected to the gate control circuit.

As a person skilled in the art will readily appreciate, the above description is meant as an illustration of implementation of the principles this disclosure. This description is not intended to limit the scope or application of this system in that the system is susceptible to modification, variation and change, without departing from the spirit of this disclosure, as defined in the following claims.

The invention claimed is:

1. A four-level rectifier, comprising:
an output;
a first capacitor, a second capacitor, and a third capacitor in series connection, the first capacitor, the second capacitor, and the third capacitor each having a first side and a second side, the output connected between the first side of the first capacitor and the second side of the third capacitor; and
three phases, each phase of the three phases including:
an input;
a first diode connected between the input and the first side of the first capacitor;
a second diode connected between the input and the second side of the third capacitor; and
a first switch, a second switch, and a third switch each having a first side and a second side;
wherein the first switch is connected between the input and the first side of the second switch and the first side of the third switch;
wherein the second side of the second switch is connected to the second side of the first capacitor and to the first side of the second capacitor; and
wherein the second side of the third switch is connected to the second side of the second capacitor and to the first side of the third capacitor.

2. The rectifier of claim 1, wherein the first diode includes:
an anode connected to the input; and
a cathode connected to the first side of the first capacitor.

3. The rectifier of claim 1, wherein the second diode includes:
a cathode connected to the input; and
an anode connected to the second side of the third capacitor.

4. The rectifier of claim 1, wherein the first switch is configured as a bi-directional switch.

5. The rectifier of claim 4, wherein the first switch includes two transistors.

6. The rectifier of claim 4, wherein:
the first switch includes a first MOSFET transistor and a second MOSFET transistor;
a source of the first MOSFET transistor is connected to the input and a drain of the first MOSFET transistor is connected to a drain of the second MOSFET transistor; and
a source of the second MOSFET transistor is connected to the first side of the second switch and to the first side of the third switch.

7. The rectifier of claim 4, wherein:
the first switch includes a first MOSFET transistor and a second MOSFET transistor;
a drain of the first MOSFET transistor is connected to the input and a source of the first MOSFET transistor is connected to a source of the second MOSFET transistor; and
a drain of the second MOSFET transistor is connected to the first side of the second switch and to the first side of the third switch.

8. The rectifier of claim 4, wherein:
the first switch includes a first IGBT transistor and a second IGBT transistor;
a collector of the first IGBT transistor and an emitter of the second IGBT transistor are connected to the input; and
an emitter of the first IGBT transistor and a collector of the second IGBT transistor are connected to the first side of the second switch and to the first side of the third switch.

9. The rectifier of claim 4, wherein:
the first switch includes a transistor and four diodes, the four diodes including a first switch diode, a second switch diode, a third switch diode, and a fourth switch diode;
the input is connected to an anode of the first switch diode and a cathode of the second switch diode;
the transistor is connected between a cathode of the first switch diode and an anode of the second switch diode;
a cathode of the third switch diode is connected to the cathode of the first switch diode and to the transistor;
an anode of the fourth switch diode is connected to the anode of the second switch diode and to the transistor; and
an anode of the third switch diode and a cathode of the fourth switch diode are connected to the first side of the second switch and to the first side of the third switch.

10. The rectifier of claim 1, wherein:
the second switch is a MOSFET transistor;
a source of the MOSFET transistor is connected to the first switch; and
a drain of the MOSFET transistor is connected to the second side of the first capacitor and to the first side of the second capacitor.

11. The rectifier of claim 1, wherein:
the third switch is a MOSFET transistor;
a drain of the MOSFET transistor is connected to the first switch; and
a source of the MOSFET transistor is connected to the second side of the second capacitor and to the first side of the third capacitor.

12. The rectifier of claim 1, further comprising a balancing circuit including four switches and two inductors.

13. The rectifier of claim 1, further comprising a balancing circuit including a first inductor, a second inductor, a first balancing circuit switch, a second balancing circuit switch, a third balancing circuit switch, and a fourth balancing circuit switch, wherein:
the first balancing circuit switch has (i) a first side connected to the first side of the first capacitor and (ii) a second side connected to the second side of the first capacitor via the first inductor;
the second balancing circuit switch has (i) a first side connected to the first side of the second capacitor via the first inductor and (ii) a second side connected to the second side of the second capacitor;
the third balancing circuit switch has (i) a first side connected to the first side of the second capacitor and (ii) a second side connected to the second side of the second capacitor via the second inductor; and
the fourth balancing circuit switch has (i) a first side connected to the first side of the third capacitor via the second inductor and (ii) a second side connected to the second side of the third capacitor.

14. The rectifier of claim 1, further comprising a gate controller configured to compare an input voltage to at least one of a first control wave, a second control wave, and a third control wave, wherein:
the first control wave, the second control wave, and the third control wave are offset from one another; and
the gate controller is further configured to:
activate a first transistor of the first switch when the input voltage is greater than or equal to the first control wave;
activate the second switch when the input voltage is greater than or equal to the second control wave
deactivate the third switch when the input voltage is less than or equal to the second control wave; and
activate a second transistor of the first switch when the input voltage is less than the third control wave.

15. A four-level rectifier, comprising:
an output;
a first capacitor, a second capacitor, and a third capacitor in series connection, the first capacitor, the second capacitor, and the third capacitor each having a first side and a second side, the output connected between the first side of the first capacitor and the second side of the third capacitor; and
three phases, each phase of the three phases including:
an input;
a first transistor connected between the input and the first side of the first capacitor;
a second transistor connected between the input and the second side of the third capacitor; and
a first switch, a second switch, and a third switch each having a first side and a second side;
wherein the first switch is connected between the input and the first side of the second switch and the first side of the third switch;
wherein the second side of the second switch is connected to the second side of the first capacitor and to the first side of the second capacitor; and
wherein the second side of the third switch is connected to the second side of the second capacitor and the first side of the third capacitor.

16. A four-level rectifier, comprising:
a positive output;
a negative output;
a first capacitor, a second capacitor, and a third capacitor in series connection, the first capacitor, the second capacitor, and the third capacitor each having a first side and a second side, the positive output connected to the first side of the first capacitor and the negative output connected to the second side of the third capacitor; and
three phases, each phase of the three phases including:
an input;
a first diode having a cathode in connection with the positive output;
a second diode having a cathode connected to an anode of the first diode;
a third diode having a cathode connected to an anode of the second diode and to the input;
a fourth diode having (i) a cathode connected to an anode of the third diode and (ii) an anode in connection with the negative output; and
at least one first switch, a second switch, and a third switch each having a first side and a second side;
wherein the at least one first switch is connected between the cathode of the second diode and the anode of the third diode, the at least one first switch configured to control current flow to the first side of the second switch and to the first side of the third switch;
wherein the second side of the second switch is connected to the second side of the first capacitor and to the first side of the second capacitor; and
wherein the second side of the third switch is connected to the second side of the second capacitor and to the first side of the third capacitor.

17. The rectifier of claim 16, wherein:
the at least one first switch includes a first transistor and a second transistor;
a drain of the first transistor is connected to the cathode of the second diode;
a source of the second transistor is connected to the anode of the third diode; and
a source of the first transistor and a drain of the second transistor are connected to the first side of the second switch and to the first side of the third switch.

18. The rectifier of claim 16, wherein:
the second switch is a transistor;
a source of the transistor is connected to the at least one first switch; and
a drain of the transistor is connected to the second side of the first capacitor and to the first side of the second capacitor.

19. The rectifier of claim 16, wherein:
the third switch is a transistor;
a drain of the transistor is connected to the at least one first switch; and
a source of the transistor is connected to the second side of the second capacitor and to the first side of the third capacitor.

20. The rectifier of claim 16, wherein:
the at least one first switch includes a first transistor and a second transistor, the second switch is a third transistor, and the third switch is a fourth transistor;
the first transistor, the second transistor, the third transistor, and the fourth transistor each include a source and a drain;
the drain of the first transistor is connected to the anode of the first diode and to the cathode of the second diode, and the source of the first transistor is connected to the source of the third transistor and the drain of the fourth transistor;

the source of the second transistor is connected to the anode of the third diode and to the cathode of the fourth diode, and the drain of the second transistor is connected to the source of the third transistor and the drain of the fourth transistor;

the drain of the third transistor is connected to the second side of the first capacitor and to the first side of the second capacitor; and the source of the fourth transistor is connected to the second side of the second capacitor and to the first side of the third capacitor.

* * * * *